United States Patent [19]
Oka

[11] Patent Number: 5,675,593
[45] Date of Patent: Oct. 7, 1997

[54] LASER BEAM GENERATOR

[76] Inventor: Michio Oka, c/o Sony Corporation, 7-35 Kitashinagawa, 6-Chome, Shinagawa-Ku, Tokyo, Japan

[21] Appl. No.: 693,014

[22] Filed: Aug. 6, 1996

Related U.S. Application Data

[63] Continuation of Ser. No. 77,099, Jun. 6, 1993, abandoned.

[30] Foreign Application Priority Data

| Jun. 19, 1992 | [JP] | Japan | 4-186147 |
| Jun. 30, 1992 | [JP] | Japan | 4-194574 |
| Jul. 3, 1992 | [JP] | Japan | 4-176776 |

[51] Int. Cl.$^6$ .................................................. H01S 3/10
[52] U.S. Cl. .................................................. 372/21; 372/22
[58] Field of Search .................................. 372/22, 105, 21, 372/32, 93, 97; 359/328

[56] References Cited

U.S. PATENT DOCUMENTS

| 4,933,347 | 6/1990 | Anthon et al. | 372/21 |
| 5,177,751 | 1/1993 | Kobayashi et al. | 372/93 |
| 5,193,096 | 3/1993 | Amano | 372/70 |
| 5,197,073 | 3/1993 | Oka | 372/22 |
| 5,245,618 | 9/1993 | Masuda et al. | 372/22 |
| 5,303,250 | 4/1994 | Masuda et al. | 372/21 |

FOREIGN PATENT DOCUMENTS

| 336 665 | 10/1989 | European Pat. Off. | |
| 398 570 | 11/1990 | European Pat. Off. | |
| 455 383 | 11/1991 | European Pat. Off. | |
| 508 406 | 10/1992 | European Pat. Off. | |
| 0108785 | 5/1991 | Japan | 372/20 |
| 4347824 | 12/1992 | Japan | 359/328 |

OTHER PUBLICATIONS

D. W. Anthon et al., "Intracavity Doubling of CW Diode-Pumped Nd:YAG Lasers with KTP", vol. 28, No. 4, Apr. 1992, pp. 1148–1157 IEEE Jou. Quan. Elec.

Patent Abstracts of Japan, No. JP3141680, 17 Jun. 1991, vol. 15, No. 359, "Inner Multiple Harmonic Laser Oscillator".

Patent Abstracts of Japan, No. JP4013118, 17 Jan. 1992, vol. 16, No. 163, "Stabilizing Device for Output of Light Wavelength Converter".

Forrest, "External Nd:YAG Doubler Sets Efficiency Mark", Laser Focus/Electro-Optics, vol. 24, No. 2, Feb. 1988, pp. 26–28.

Bhar et al., "Enhancement of Second Harmonic Generation by Double-Pass Configuration in Barium Borate", Applied Physics B. Photo-physics and Laser Chemistry, vol. 51, No. 5, Nov. 1990, pp. 317–319.

(List continued on next page.)

Primary Examiner—Rodney B. Bovernick
Assistant Examiner—Robert E. Wise
Attorney, Agent, or Firm—Hill, Steadman & Simpson

[57] ABSTRACT

A laser beam generator includes first and second mirrors, a laser light source, a laser medium, a non-linear optical crystal element and a birefringent element. The laser light source generates a pumping light beam. The laser medium, arranged between the first and second mirrors, is irradiated with the pumping light beam via one of the mirrors to generate a fundamental laser beam based on the pumping light beam. The non-linear optical crystal element is arranged between the first and second mirrors to generate a second harmonic laser beam under the type II phase matching as the fundamental laser beam from the laser medium is passed through it in resonant oscillation. The birefringent element has its one surface at a pumping light beam inlet side coated with a high reflectance coating and has its opposite surface parallel to it with a nonreflective coating. The birefringent element is set so that its optical axis is inclined at a predetermined azimuth angle with respect to the crystal axis of the non-linear optical crystal element. The surface of the birefringent element coated with a high reflectance coating constitutes one of the first or second mirrors.

10 Claims, 13 Drawing Sheets

OTHER PUBLICATIONS

Malcolm et al., "Efficient Frequency Conversion of Mode-Locked Diode-Pumped Lasers and Tunable All-Solid-State Laser Sources", *IIEE Journal of Quantum Electronics*, vol. 28, No. 4, Apr. 1992, pp. 1172–1178.

Gerstenberger, et al., "Efficient Second-Harmonic Conversion of CW Single-Frequency Nd:YAG Laser Light by Frequency Locking to a Monolithic Ring Frequency Doubler", *Optics Letters*, vol. 16, No. 13, Jul. 1991, pp. 992–994.

LASER BEAM GENERATOR

This is a continuation, of application Ser. No. 08/077,099, filed Jun. 16, 1993 now abandon.

BACKGROUND

1. Field of the Invention

This invention relates to a laser beam generator and, more particularly, to a laser beam generator for generating a laser beam having a wavelength translated by a non-linear optical crystal element.

2. Background of the Invention

It as hitherto been proposed to achieve efficient wavelength conversion by taking advantage of the high power density in a resonator. For example, researches have been conducted for second harmonic generation (SHG) by an external resonator type device and SHG by a device having a non-linear optical element provided within the resonator.

As example of a generator of the type of SHG within the laser resonator is a generator in which a laser medium and the non-linear optical crystal element are arranged between a pair of reflecting mirrors as components of the resonator. With the type of the laser beam generator, the second harmonic laser beam is phase-matched with respect to the fundamental laser beam within non-linear optical crystal element within the resonator for efficiently taking out a second harmonic laser beam.

For achieving phase matching, it is necessary to set up type I or type II phase matching conditions between the fundamental laser beam and the second harmonic laser beam. The type I phase matching is based on a principle of creating a phenomenon of producing a photon of a doubled frequency from two photons polarized in the same direction by taking advantage of an ordinary light beam of the fundamental laser beam. With the type II phase matching, on the other hand, two fundamental waves of proper polarization perpendicular to each other are caused to fall on a non-linear optical crystal element for setting up phase matching conditions for each of these beams. With the type II phase matching, the fundamental wavelength laser beam is split by in the non-linear optical crystal element into an ordinary light and an extraordinary light beam to effect phase matching with respect to the extraordinary light beam of the second harmonic laser beam.

However, if it is desired to generate the second harmonic laser beam using the type II phase matching conditions, proper polarization of the fundamental laser beam undergoes phase changes time the fundamental laser beam is repeatedly passed through the non-linear optical element, as a result of which the second harmonic laser beam tends to be generated only unstably if the type II phase matching conditions are employed.

That is, if proper oscillations perpendicular to each other, that is p-wave component and s-wave component, are deviated progressively in phase each time the fundamental laser beam generated by resonation in the laser medium is passed through the non-linear optical crystal element, it becomes impossible to realize steady-state condition in each part of the resonator in which the laser light beams efficiently strengthen one another, such that a state of strong resonation, that is a strong standing wave, cannot be produced within the resonator. The result is that the translation efficiency from the fundamental laser beam into the second harmonic laser beam is deteriorated and the noise tends to be produced in the second harmonic laser beam.

The present Assignee has already proposed in JP Patent KOKAI Publication No.1-220879 (1989) a laser beam generator in which a birefringent element, such as a quarter wave plate, is inserted in a resonation light path of a fundamental laser beam in a laser source adapted for generating a second harmonic laser beam by a non-crystal optical element for stabilizing the second harmonic laser light radiated as an output laser beam.

FIG. 1 shows a typical laser beam generator as disclosed in JP Patent KOKAI Publication No. 1220879. The laser beam generator shown therein has a resonator 201 comprised of a reflecting surface 203, such as a dichroic mirror formed on the incident surface of a rod-shaped laser medium 202, such as Nd:YAG laser medium, and another reflecting surface, such as a dichroic mirror, formed on the inner surface of an output concave mirror 104. The Nd:YAG laser medium 202, a non-linear optical crystal element 206, formed of KTP (KTiOPO$_4$), and a birefringent element 207, are arrayed within the resonator 201. The birefringent plate 201 is formed by a quartz plate designed as a quarter wave plate, for producing a phase difference of one-quarter cycle of the fundamental laser beam generated in the laser medium 202 within the resonator 201. The laser medium 202 generates the fundamental laser beam by a pumping light from the pumping semiconductor laser 211 falling on an incident surface 203 of the laser medium 202 via collimator lens 212 and object lens 213. The fundamental laser light is transmitted through non-linear optical crystal element 206 and birefringent plate 207 so as to be reflected by the reflecting surface of the concave mirror 204. The fundamental laser beam is again transmitted through birefringent element 207, non-linear optical crystal element 206 and laser medium 202 in this order so as to be reflected by the reflecting surface 203. Thus the fundamental laser light travels back and forth between the incident reflective surface 203 of the laser medium 202 and the inner reflecting surface of the output concave mirror 204 within the resonator 201 by way of performing a resonant oscillation.

The birefringent element 207, such as the quarter wave plate, has its optical axis set so that the direction of the refractive index for extraordinary light $n_{e(7)}$ is inclined a predetermined azimuth angle, such as azimuth angle θ=45°, with respect the direction of the refractive index of the non-linear optical element 206 for extraordinary light $n_{e(6)}$, within the plane perpendicular to the oscillation of the amplitude of the light, as shown in FIG. 2.

In the above-described laser beam generator, the second harmonic laser beam is generated as the fundamental laser beam is passed through the resonant light path via the non-linear optical crystal element 206. The second harmonic laser beam is transmitted through the concave mirror 204 so as to be radiated as output laser beam.

It is noted that the light beams making up the fundamental laser beam are transmitted trough the birefringent element 207, adjusted to an azimuth angle θ=45° with respect to the non-linear optical crystal element 206, for stabilizing the laser beam power at each part of the resonator to a predetermined level. That is, as the fundamental laser beam generated the laser medium 202 is passed through the non-linear optical crystal element 206 by way of resonant oscillation to produce a type II second harmonic laser beam, coupling by sum frequency generation between the two polarization modes of the fundamental laser beam perpendicular to each other is inhibited, as a result of which the oscillation of the second harmonic laser beam may be stabilized. If the two proper polarization modes of the p-wave component and the s-wave component are of equal intensity, the spatial phase difference between the two proper polarization modes becomes equal to 90°, as shown in FIG. 3(A). The result is that two polarization modes are simultaneously set into oscillation so that the standing wave in the resonator becomes uniform in light intensity, as shown in FIG. 3(B). In this manner, the spatial hole burning effect, which indicates axial spatial non-uniformity of the oscillation gain, may be inhibited to produce stable double longitudinal mode oscillation.

Meanwhile the quarter wave plate 107, as the birefringent plate, has its both sides coated with anti-reflection (AR) coating to permit 100% transmission of the fundamental laser beam having a way length of 1064 nm. In other words, the birefringent element 107 has its both sides coated with AR coating to permit 0% reflection of the fundamental laser beam having a wavelength of 1064 nm. However, in effect, the AR coating of the quarter wave plate 107 is subject to residual reflection such that 0% reflectance cannot be achieved and residual reflection R on the order of 0.1% is incurred. By this residual reflection R, multiple refection is incurred within the quarter wave plate. With the wavelength $\lambda$, the thickness of the quarter wave plate D and with the refractive index of the quarter wave plate $\underline{n}$, the reflectance $R_m$ of the multiple reflection may be expressed by $$R_m = \frac{4R\sin^2\Delta/2}{((1-R)^2 + 4R\sin^2\Delta/2)} \quad (1)$$

where $\Delta = 4\pi n D/\lambda$.

Therefore, if fluctuations in the effective thickness of the quarter wave plate on the order of the quarter wave plate thickness are changed from 0 to $\lambda/4$ due to thermal expansion or manufacture tolerances, the reflectance $R_m$ is changed from 0 to about 4R. Since the quarter wave plate has a difference in thickness of one-quarter of a wavelength with respect to the incident polarized light, a difference in the loss within the resonator of about 4R at a maximum is produced between the two polarization modes.

If there is such difference in the loss within the resonator between the two polarization modes, there is incurred a difference in intensity between the two modes of proper polarization, that is the p-wave component and the s-wave component as shown in FIG. 4(A), so that the standing wave within the resonator becomes non-uniform, as shown in FIG. 4(B), to incur the above-mentioned spatial hole burning effects. If double or more longitudinal modes are oscillated, there may be occasions wherein the oscillation becomes non-uniform due to coupling by sum frequency generation between the longitudinal modes of the same polarization, by reason of the nonuniform intensity of the standing wave.

Meanwhile, in the above-described resonator of the standing wave type in which the light beam is caused to travel back and forth repeatedly between two mirrors, since the fundamental laser beam falls on the non-linear optical crystal element as it travels back and forth repeatedly between the mirrors, the second harmonic laser set beams are generated in two directions with respect to the non-linear optical crystal element. For example, in the basic resonator shown in FIG. 5 in which a non-linear optical crystal element 222 and a laser medium 223 are provided on a light path in the resonator made up of an optical element 221 having a reflecting surface 221R for transmitting 100% of the second harmonic laser beam having the wavelength of 532 nm and reflecting 100% of the fundamental laser beam having the wavelength of 1064 nm and an optical element 224 having a reflecting, surface 224R for transmitting 100% of the second harmonic laser beam having the wavelength of 532 nm and reflecting 100% of the fundamental laser beam having the wavelength of 1064 nm,the fundamental laser beam generated in the laser medium 223 is incident on the non-linear optical crystal element 222 as it caused to travel back and forth repeatedly between the reflecting surfaces 221R and 224R, so that the second harmonic laser beam generated in the non-linear optical crystal element 222 is radiated in two directions, that is towards the reflecting surface 221R and towards the reflecting surface 224R.

However, it is difficult to realize a mirror coating reflecting 100% of the fundamental laser beam and transmitting 100% of the second harmonics, such that several to tens of percents of reflection of the second harmonic laser beam is necessarily incurred, as shown in FIG. 6 which illustrates characteristics of the mirror coating applied to a quartz surface. For example, transmittance to the second harmonic laser beam having a wavelength $\lambda$ of 532 nm is about 97%, such that about 3% of the beam is reflected. On the other hand, transmittance to the fundamental laser beam having a wavelength $\lambda$ of 1064 nm is about 99.91%.

If, with a reflecting surface on which a coating is applied to permit approximately 100% transmission of the second harmonic laser light, 1% of the light is reflected due to manufacture tolerances, the reflected light in the amount of 1% is superimposed on the other second harmonic laser beam to produce interference.

The phase of the reflected light is usually constant at all times if he fundamental laser beam and the second harmonic laser beam have the same speed of propagation and both of these laser light beam are not subject to dispersion. However, since dispersion is incurred by air, non-linear optical crystal element and by the laser medium, the reflected light is changed in phase because of changes in temperature. When the reflected light beam is changed in phase in this manner, the forward light intensity I given by $$I=|1+\sqrt{R}e^{iw}|^2=1+2\sqrt{R}\cos w + R \quad (2)$$

is incurred where $\underline{w}$ and R indicate the phase and the reflectance of the reflected light, respectively.

The following Table 1 shows values of amplitudes of intensity fluctuations (2√R) when the phase of reflected light is change from 0 to $\pi$ for several values of reflectance R of the reflected light, as calculated by the formula (2), and the backward intensity (=1-R).

TABLE 1

| reflectance R of reflected light | amplitude of 2√R of intensity fluctuations | backward intensity (= 1 − R) |
|---|---|---|
| 10% | 67% | 90% |
| 1% | 20% | 99% |
| 0.1% | 6.7% | 99.9% |
| 0.01% | 2% | 99.99% |

It seen from Table 1 that fluctuations intensity amounting to ±20% are incurred even with the reflectance R of the reflected light of 1%. That is, with the backward intensity (1-R) =99% for the reflectance R of 1%, its backward output obviously differs from the forward effective output accompanied by fluctuations in intensity amounting to ±20%. Consequently, if it is attempted to control the intensity of the light of the forward effective output in the laser beam generator shown in FIG. 5 based on the detected value of the intensity of the backward output, it is difficult to maintain a constant output because the forward and backward second harmonic laser light beam intensities are not coincident with each other by interference effects.

On the other hand, it is also seen from Table 1 that, if the intensity fluctuations should be maintained within a range of ±2%, it is necessary to keep the reflectance R of the reflected light within 0.0%. That is, the changes in intensities cannot be maintained within 2% with a mirror having the mirror coating having characteristics as shown in FIG. 6.

Although a part of the forward output may be split by a beam splitter and detected by a photodetector, the number of optical component is correspondingly increased, while an output efficiency is lowered.

SUMMARY OF THE INVENTION

It i an object of the present invention to provide a laser beam generator whereby a stable output and high efficiency oscillation may be achieved.

In aspect of generator invention, a laser beam generator includes first and second mirrors, a laser light source, a laser medium, a non-linear optical crystal element and a birefringent element. The laser light source generates a pumping light beam. The laser medium, arranged between the first and second mirrors, is irradiated with the pumping light beam via one of the mirrors to generate a fundamental laser beam based on the pumping light beam. The non-linear optical crystal element is arrange between the first and second mirrors to generate a second harmonic laser beam under the type II phase matching as the fundamental laser beam from the laser medium is passed therethrough in resonant oscillation. The birefringent element has its one surface at a pumping light beam inlet side coated with a high reflectance coating and has its opposite surface parallel to it with an anti-reflective coating. The birefringent element is set so that its optical axis is inclined at a predetermined azimuth angle with respect to the crystal axis of the non-linear optical crystal element. The surface of the birefringent element coated with a high reflectance coating constitutes one of the first or second mirrors.

In a another aspect of the present invention, a laser beam generator includes first and second mirrors, making up a resonator, a laser light source, a laser medium, a non-linear optical crystal element and a optical path folding mirror. The laser light it source generates a pumping light beam. The laser medium is irradiated with the pumping light beam via one of the first or the second mirror to generate a fundamental laser beam based on the pumping light beam. The non-linear optical crystal element is arranged within the resonator to generate a second harmonic laser beam when the fundamental laser beam from the laser medium is passed therethrough in resonant oscillation. The optical axis folding mirror is provided within the resonator for folding the optical paths of the fundamental laser beam and the second harmonic laser beam.

In yet another aspect of the present invention, a laser beam generator includes first and second mirrors, making up a resonator, a laser light source, a laser medium, a non-linear optical crystal element and a controller. The laser light source generates pumping light beam. The laser medium is irradiated with the pumping light beam via one of the first or second mirrors to generate a fundamental laser beam based on the pumping light beam. The controller controls the output of the laser light source using the second harmonic laser beam outputted from one of the first and second mirrors.

According to the present invention, multiple reflection may be positively utilized by applying a high reflectance coating and an anti-reflection coating on one and the other surfaces of the birefringent element, respectively. Since the effective reflectance of the multiple reflection is always equal to unity, stable oscillation free of spatial hole burning may be achieved by eliminating losses in the resonator derived from loss difference between the polarization modes. According to the present invention, a stable laser output may be achieved without interference in the second harmonic laser beams produced in either axial directions parallel to the optical axis within the resonator. An effective laser output may be stably maintained by controlling the laser light source generating the pumping light by utilizing the second harmonic laser beam.

DESCRIPTION OF THE INVENTION

Figure 1:
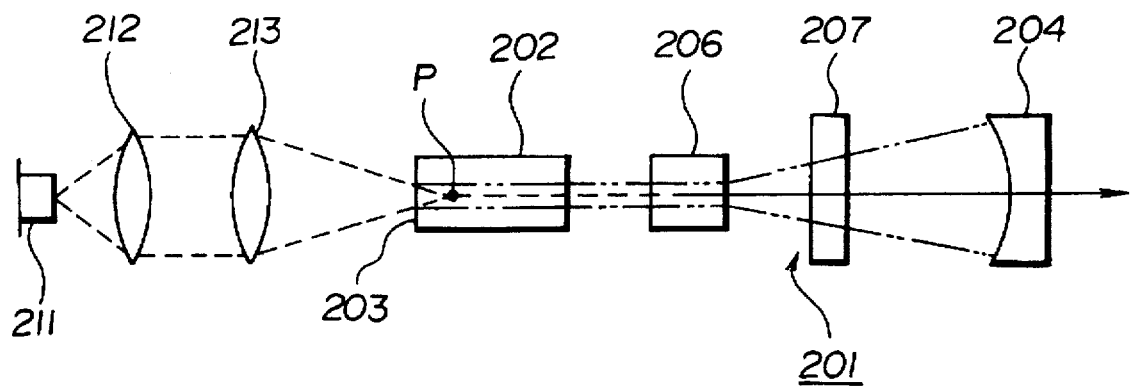
FIG. 1 shows an arrangement of a conventional laser beam generator.
Figure 2:
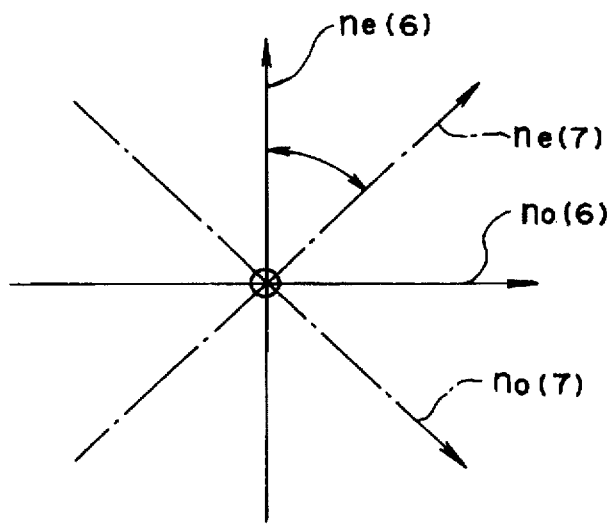
FIG. 2 is an explanatory view showing an azimuth angle of a birefringent plate employed in the laser beam generator shown in FIG. 1.
Figure 3A:
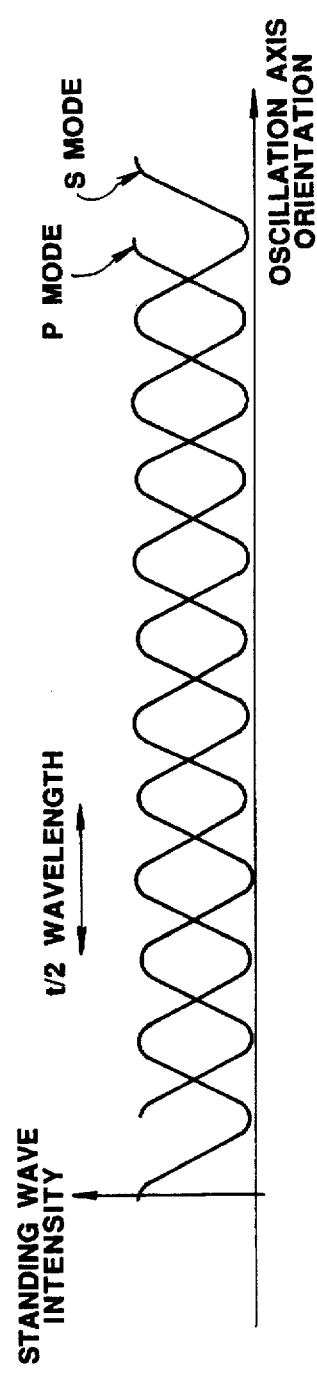
FIG. 3(A) and (B) are graphs for illustrating uniformity of the oscillation gain in case of equal polarization modes.
Figure 3B:
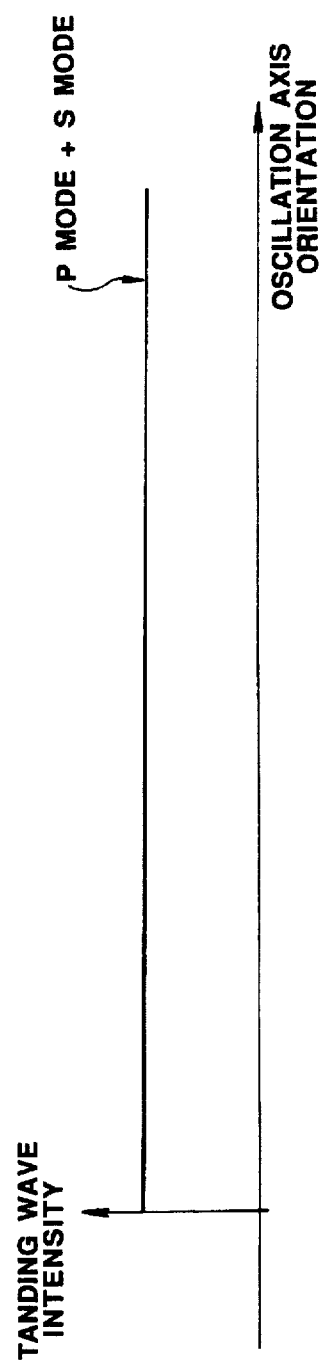
Figure 4A:
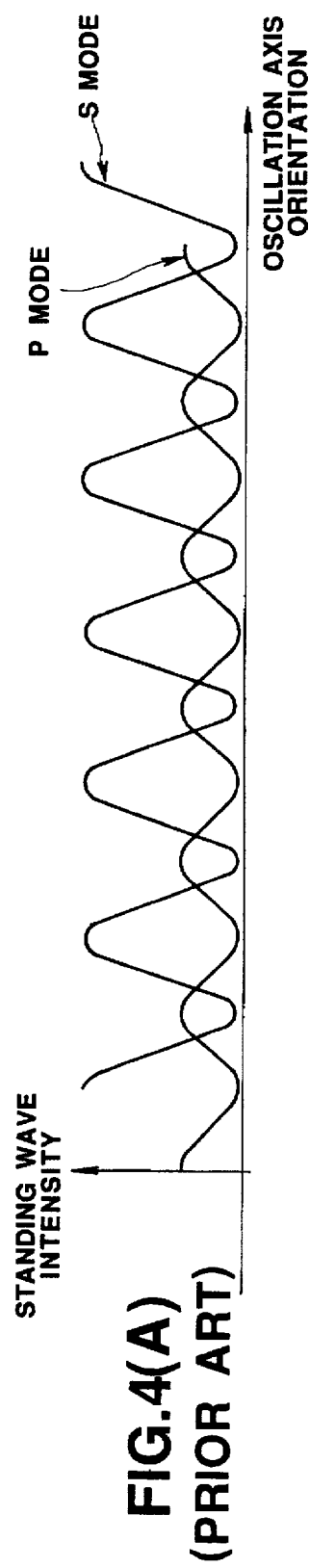
FIG. 4A–4B are graphs for illustrating non-uniformity of the oscillation gain in case of unequal polarization modes.
Figure 4B:
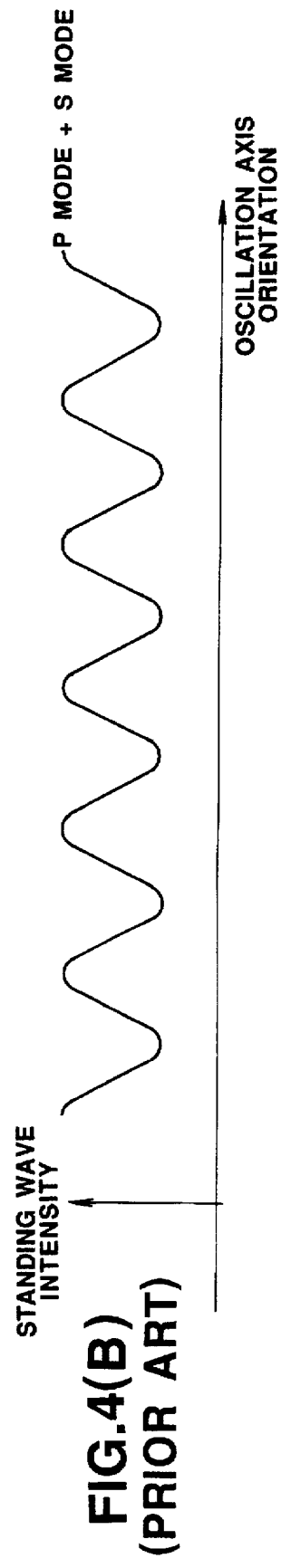
Figure 5:
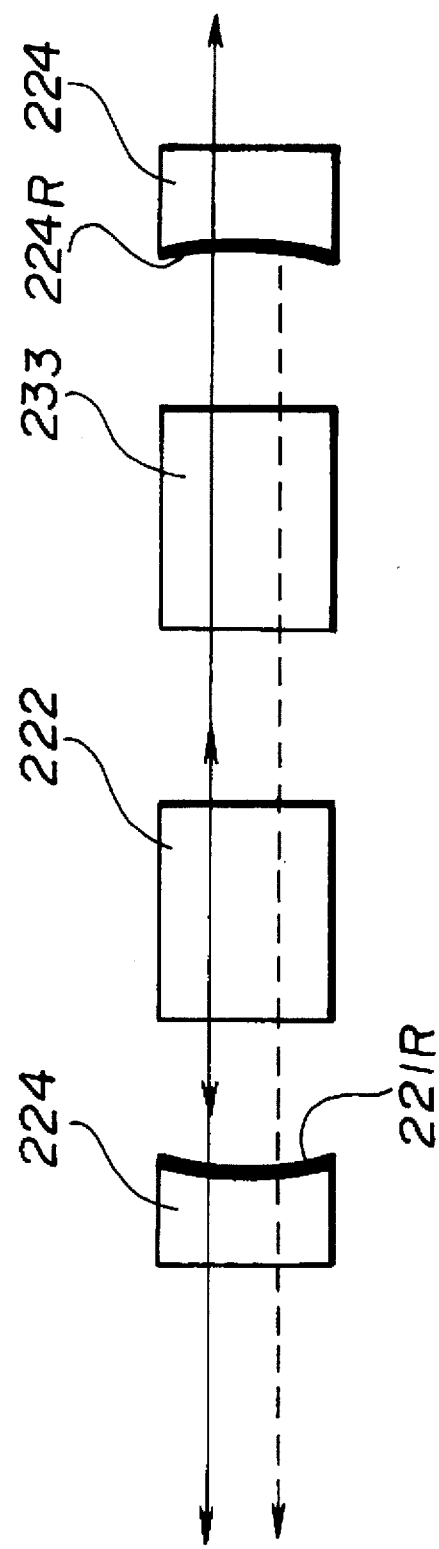
FIG. 5 illustrates interference of the second harmonic laser beams within the conventional laser beam generator.

Referring to the drawings, the laser beam generator according to the present invention will be explained in more detail.

Figure 7:
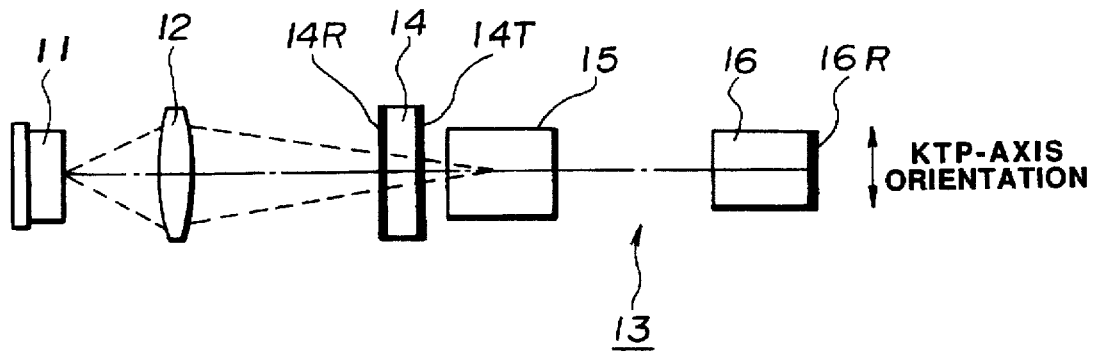
FIG. 7 shows an arrangement of a laser light generator according to a first embodiment of the present invention.

FIG. 7 is a schematic view showing an arrangement of the laser generator according to the first embodiment of the present invention.

In FIG. 7, 11 is a laser diode as a semiconductor laser device as a pumping light source. 12 is a convex lens for converging the exciting light outgoing from laser diode 11.

13 is a resonator comprised of reflecting surfaces 14R and 16R as later described. 14 is a quarter wave plate as a birefringent plate. The surface 14R of the quarter wave plate 14 facing the laser diode 11 is coated with high reflectance coating, while an opposite surface 14T thereof is coated with an anti-reflection coating. The surfaces 14R and 14T of the quarter wave plate 14 are parallel to each other. 15 is a rod-shaped laser medium composed of Nd:YAG. However, Nd:YVO$_4$, LNP or Nd:BEL may also be employed in place of Nd:YAG as a laser medium. 16 is a non-linear optical crystal element composed of KTP(KTiPO$_4$). The surface of the non-linear optical crystal element 16 facing the laser medium 15 is the aforementioned reflecting surface 16R.

The reflecting surface 14R is a reflecting surface having wavelength selectivity, such as a dichroic lens. The reflecting surface 14R transmits the pumping light of a wavelength of 810 nm radiated from laser diode 11 while reflecting the fundamental laser beam of a wavelength of 1064 nm generated in the laser medium 15. On the other hand, the reflecting surface 16R is also a reflecting surface having wavelength selectivity, similarly to the reflecting surface 16R. That is, the reflecting surface 16R reflects the fundamental laser beam of a wavelength of 1064 nm generated in the laser medium 15 while transmitting the second harmonic laser beam of a wavelength of 532 nm generated by the non-crystal optical crystal cement 16. The fundamental laser beam, generated in the laser medium 15, is caused to travel back and forth repeatedly between the reflecting surfaces 14R and 16R of the resonator by way of laser beam oscillation. The quarter wave plate 14 has its optical is set at an azimuth angle θ=45° with respect to the optical axis of the non-linear optical crystal element 16, as disclosed in the aforementioned JP Patent KOKAI Publication No.01-220879.

The pumping light outgoing from laser diode 11 is converged by lens 12 to fall on the laser medium 15 via reflecting surface 14R. Based on the pumping light, laser medium 15 generates the fundamental laser beam, which is incident on the non-linear optical crystal element 16. The non-linear optical crystal element 16 generates the second harmonic laser beam having a frequency equal to twice the frequency of the fundamental laser beam. The fundamental laser beam is reciprocated between the reflecting surfaces 14R and 16R to achieve laser oscillation. The aforementioned type II phase matching is carried out by the quarter wave plate which is the birefringent plate inserted within the resonator 13.

Besides, the quarter wave plate 14 has the reflecting surface 14R provided with the high reflectance coating with respect to the fundamental laser beam and a transmitting surface 14T provided with an anti-reflection coating with respect to the fundamental laser beam, with the reflecting surface 14R and the transmitting surface 14T running parallel to each other. Consequently, it is possible to take advantage of multiple reflection positively within the quarter wave plate 14.

If the loss in the quarter wave plate 14 is neglected, the reflectance R$_m$ of multiple reflection is given by $$R_m = \frac{(\sqrt{R_{AR}} - \sqrt{R_{HR}})^2 + 4\sqrt{R_{AR}}\sqrt{R_{HR}}\sin^2\Delta/2}{(1 - \sqrt{R_{AR}R_{HR}})^2 + 4\sqrt{R_{AR}}\sqrt{R_{HR}}\sin^2\Delta/2} \quad (3)$$

wherein R$_{HR}$ is the reflectance of the high reflectance coating of the reflecting surface 14R with respect to the fundamental laser beam, R$_{AR}$ is the residual reflectance of the anti-reflection coating of the transmitting surface 14T, and $\Delta = 4\pi nD/\lambda$, where $\lambda$ is the wavelength, D is the thickness of the quarter wave plate 14 and $\underline{n}$ is the refractive index of the quarter wave plate 14.

It is noted that the residual reflectance R$_{AR}$ of the anti-reflection coating is on the order of 0.1%. If the anti-reflection coating is applied to both surfaces, as in the prior-art generator, up to 0.4% reflection for a single pass (0.8% reflection for reciprocation pass) is incurred to lower the efficiency by resonator losses. Besides, differences in the losses are produced between the two polarization modes, so that stable oscillation cannot be realized due to spatial hole burning.

However, with the present first embodiment, the reflecting surface 14R of the quarter wave plate 14 is provided with a high reflectance coating, as described above. When the high reflectance coating is applied, the reflectance R$_{HR}$ may be usually increased to as much as 99.9% or higher. Substituting this value of reflectance R$_{HR}$=1(0.999, ...) into formula (3), and calculating, $$R_m \cong \frac{(\sqrt{R_{AR}} - 1)^2 + 4\sqrt{R_{AR}}\sin^2\Delta/2}{(1 - \sqrt{R_{AR}})^2 + 4\sqrt{R_{AR}}\sin^2\Delta/2} = 1 \quad (4)$$

in which the reflectance R$_{HR}$ when the high reflectance coating is applied to the high reflectance surface 14R of the quarter wave plate 14 is perpetually equal to unity irrespective of fluctuations in residual reflectance R$_{AR}$ of the anti-reflectance coating, fluctuations in manufacture tolerances or thermal expansion, or fluctuations in the effective thicknesses on the order of the thickness of the quarter wave plate 14. That is, if the high reflectance coating is applied to the reflecting surface 14R of the quarter wave plate 14, the efficiency is not lowered due to resonator losses, while no loss difference is incurred between the polarization modes, such that stable oscillation may be achieved in a manner free from spatial hole burning.

If the reflectance R$_{HR}$ of the reflecting surface 14R of the quarter plate 14 of 99.9% is not achieved, or if there are incurred losses due to absorption within the quarter wave plate 14 or diffraction during multiple reflection, the value of reflectance equal to 99.9% less the losses may be substituted as effective reflectance into formula (4). Table 2 shows examples of maximum value* (R$_{m(max)}$) and minimum value (R$_{m(min)}$) of the reflectance R$_m$ of multiple reflection, with respect to the effective reflectance, resulting from changes in Δ. In Table 1, the residual reflectance R$_{AR}$ of the anti-reflective coating is set to 0.1%. On the other hand, (R$_m$ $_{(max)}$)−(R$_{m(min)}$) represents the maximum difference of the losses for reciprocation.

TABLE 2

| R$_{AR}$ | R$_{HR}$ | R$_{m(min)}$ | R$_{m(max)}$ | R$_{m(max)}$ − R$_{m(min)}$ |
|---|---|---|---|---|
| 0.10% | 99.90% | 99.893% | 99.906% | 0.013% |
| 0.10% | 99.50% | 99.467% | 99.531% | 0.063% |
| 0.10% | 99.00% | 98.935% | 98.061% | 0.126% |

It seen from Table 2 that, even with the value of R$_{HR}$ of 99.0%, the value of (R$_{m(max)}$)−(R$_{m(min)}$) with the present first embodiment is 0.126%, which is about one-sixth of the maximum difference of 0.8% for reciprocation with the conventional double-side anti-reflection coatings. It is noted that the effective reflectance lower than 99.5% hardly occurs in actual systems. It may be seen from this that the high reflectance coating on one surface of the quarter wave plate 14 leads to a loss difference between the two polarization modes which is smaller than with the prior-art generator.

The second embodiment of the laser beam generator according to the second embodiment of the present invention is explained.

Figure 8A:
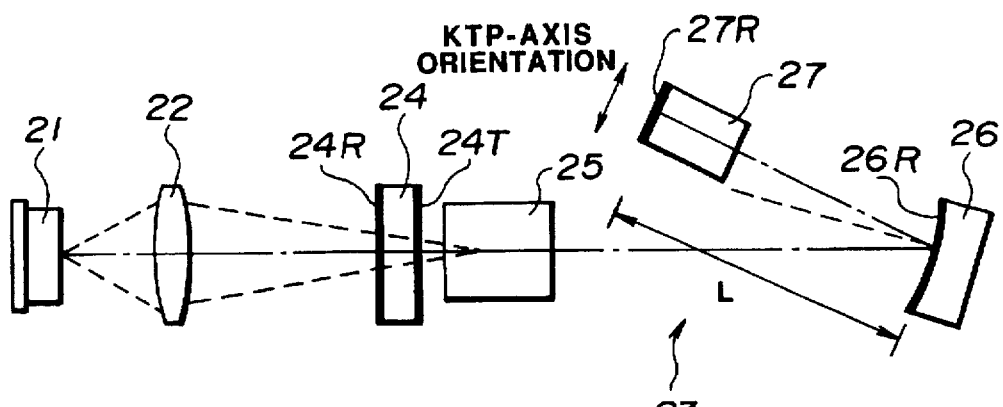
FIGS. 8A–8B shows an arrangement of a laser light generator according to a second embodiment of the present invention.
Figure 8B:
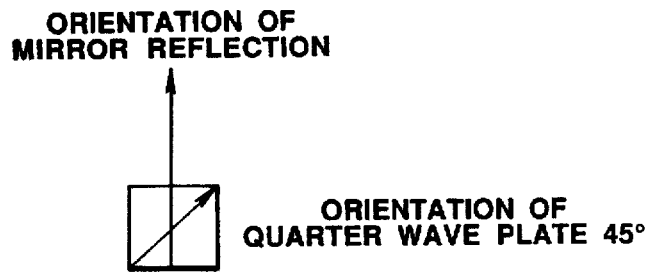

FIG. 8(A) shows an arrangement of the second embodiment of the laser beam generator and FIG. 8(B) shows the relation between the orientation of the quarter wave plate and the orientation of optical axis is folding by a mirror as a beam converging concave lens.

Referring to FIG. 8(A), a laser beam as a pumping laser beam is radiated from a laser diode 21 which is a semiconductor laser device a pumping light source. The pumping laser light is converged by lens 22 so as to be incident on a laser medium formed e.g. of Nd:YAG 25 via a quarter wave plate 24 one surface 24R of which is coated by a high reflectance coating and the other surface 24T of which is coated by a anti-reflection coating. The surfaces 24R, 24T are adjusted to be parallel to each other. The laser medium 25 is responsive to incident pumping light to generate the fundamental laser beam which has its optical axis folded by a concave-shaped reflecting surface 26R of a beam converging concave mirror 26 at an arbitrary angle so as to be incident on a non-linear optical crystal element 27 formed e.g. of KTP(KTiOPO$_4$). It is noted that the surface 24R of the quarter wave plate 24, the concave-shaped reflecting surface 26R of the beam converging concave lens 26 and end surface 27R of the non-linear optical crystal element 27 make up the reflecting surfaces constituting a resonator 23.

Similarly to the non-linear optical crystal element 16 employed in the previous embodiment, the non-linear optical crystal element 27 generates a second harmonic laser light beam of a frequency twice the frequency of the fundamental laser beam by type II phase matching. The reflecting surface 24R of the quarter wave plate 24 has characteristics similar to those of the reflecting surface 14R of the quarter wave plate 14. Similarly to the reflecting surface 16R of the non-linear optical crystal element 16 of the previous embodiment, the reflecting surface 27R of the non-linear optical crystal element 27 and the reflecting surface 26R of the beam converging concave lens 26 have the properties of reflecting the fundamental laser beam and transmitting second harmonic laser beam. These reflecting surfaces 24R, 26R and 27R may be formed by dichroic mirror. Thus the laser beam generated by the laser medium 25 is reciprocated between these reflecting surfaces 24R, 26R and 27R to effect laser beam oscillation.

The fundamental laser beam has its optical axis folded by the beam converging concave mirror 26 within the resonator 23 for preventing the fundamental laser beam from being increased in diameter. For taking advantage of the multiple reflection at the quarter wave plate within the resonator positively, it is necessary for the laser beam incident on the quarter wave plate to be a collimated beam. For this reason, the two reflecting surfaces the resonator are set so as to be parallel to each other. However, as the fundamental laser beam is reciprocated between tile parallel reflecting surfaces the fundamental laser beam is gradually increased in diameter so that the second harmonic laser beam cannot be produced efficiently by the non-linear optical crystal element. In order to prevent such situation the fundamental laser beam from the laser medium 25 has its optical axis folded by the reflecting surface 26R of the beam converging concave mirror 26, as light beam folding means, so as to be converged on the non-linear optical crystal element 27.

However, if the beam converging concave mirror 26 is used within resonator 23, and the angle of incidence of the fundamental laser beam is vertical, whereas the direction indicated by a broken line at the beam converging concave mirror 26 is not vertical, a small difference in reflectance between the fundamental laser beam incident on the reflecting surface 26R of the mirror 26 and the direction of polarization is produced because of the oblique incidence. The difference in reflectance leads to the loss difference between the two polarization modes.

Thus the folding orientation of the beam converging concave mirror lens 26 is selected in the present second embodiment to be in a plane which makes an angle of 45° relative to the optical axis of oscillation and the optical axis of the quarter wave plate 24 and which is inclusive of the oscillation optical axis. In this manner, the orientation of the inherent polarization and the orientation of the quarter wave plate 24 make an angle of 45° with respect to the orientation of the difference in the reflectance of the beam converging concave lens 26 to eliminate the differential reflectance.

Besides, with the present second embodiment, an effective distance L between the reflecting surface 26R of the beam converging lens 26 and the reflecting surface 27R of the non-linear optical element 27 is selected to be slightly larger than the focal distance of the beam converging lens 26. In this manner, the laser beam may be converged as an extremely small-sized spot at the non-linear optical crystal element 27 so that the reflected laser beam becomes a substantially collimated light beam by the operation of the reflecting surface 26R of the beam converging mirror 26.

It is seen from above that the loss difference between the two polarization modes may be eliminated with the present second embodiment as in the previous embodiment to permit stable oscillation free of spatial hole burning. Besides, since the light beam passed through the quarter wave plate 24 is substantially collimated and the angle of deviation is rather small losses are reduced otherwise caused by diffraction caused at the time multiple reflection.

Figure 9:
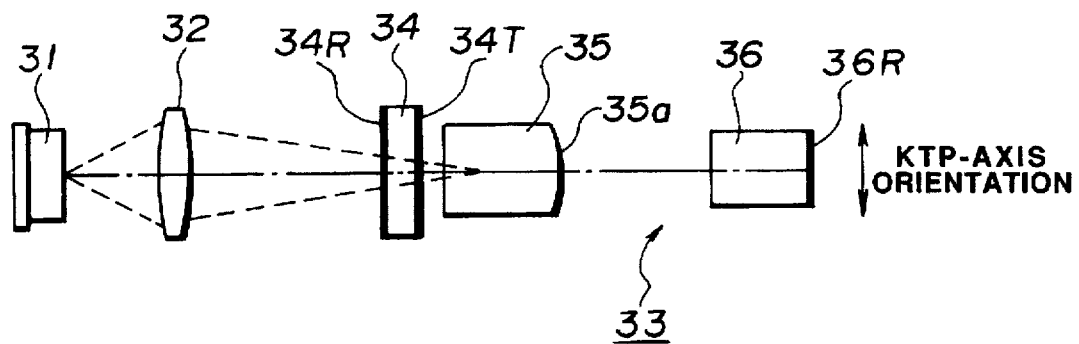
FIG. 9 shows an arrangement of a laser light generator according to a third embodiment of the present invention.

FIG. 9 shows an arrangement of a third embodiment of the laser beam generator according to the present invention.

In FIG. 9, a pumping light is radiated from a laser diode 31 which is semiconductor laser element as a pumping light source. The pump light is converged by lens 32 so as to fall on a laser medium 35 formed e.g. of Nd:YAG via a quarter wave plate 34 having its one surface 34R coated by a high reflectance coating and its other surface 34T coated by an anti-reflection coating. The surfaces 34R, 34T are parallel each other. The laser medium 35 has its one surface as a convex surface. The laser medium 35 is responsive to the incidence of the pumping light thereto to generate a fundamental laser beam which is incident a non-linear optical crystal element 36 formed e.g. of KTP(KTiOPO$_4$). The surface 34R of the quarter wave plate 34 and an end face 36R of the non-linear optical crystal element 36 make up reflecting surfaces of a resonator 33.

Similarly to the non-linear optical crystal element 16 employed n the fist embodiment, the non-linear optical crystal element 36 generates a second harmonic laser beam having a frequency twice that of the fundamental laser beam by type II phase matching. The reflecting surface 34R of the quarter wave plate 34 has properties similar to those of the reflecting surface 14R of the quarter wave plate 14 of the previous first embodiment. Similarly to the reflecting surface 16R of the non-linear optical crystal element 16 of the previous first embodiment, the reflective surface 36R of the non-linear optical crystal element 36 has the properties of reflecting the fundamental laser beam and transmitting the secondary harmonic laser beam. These reflecting surfaces 34R, 36R may be formed by dichroic mirrors. The fundamental laser beam generated in the laser medium 35 is reciprocated between the reflecting surface 34R and 36R of the laser resonator 33 to effect oscillation of the laser beam.

The surface 35a of the laser medium 35 is convex for preventing the laser beam incident on the non-linear optical crystal element 36 from being enlarged in diameter, as with the previous second embodiment. That is, with the present third embodiment, the fundamental laser beam diminished in diameter by the convex surface 35a of the laser medium 35 is caused to be incident on the non-linear liquid crystal element 36 for efficiently generating the second harmonic laser beam. Besides, with the present embodiment, the loss difference between the two polarization modes may be eliminated, as in the above-mentioned first second embodiments, for achieving stable oscillation devoid spatial hole burning.

Figure 10:
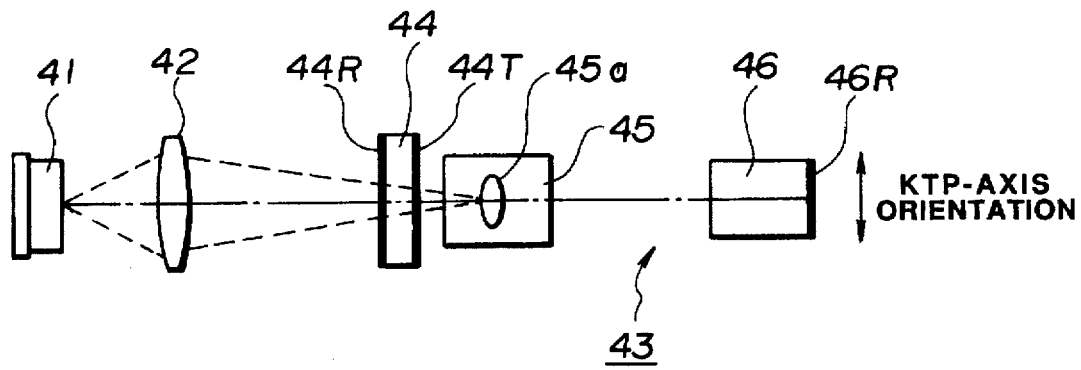
FIG. 10 shows an arrangement of a laser light generator according to a fourth embodiment of the present invention.

FIG. 10 shows an arrangement of a fourth embodiment of the laser beam generator according to the present invention.

In FIG. 10, a pumping light is radiated from a laser diode 41 which is a semiconductor laser element as a pumping light source. The pumping light is converged by lens 42 to fall on a laser medium 45 via a quarter wave plate 44 which has its one surface 44R coated by a high reflectance coating and its other surface 44T coated by an anti-reflection coating. With the laser medium 45 irradiated with the exciting light beam, a heat lens is produced within the laser medium 45. Such heat lens is generated by wave front aberration produced along the optical axis of the laser medium by a part of the pumping light beam from laser diode 41 being converted into heat to render the temperature distribution and hence the refractive index distribution in the laser medium non-uniform. That is, with the pumping light falling on the laser medium 45, the heat lens within laser medium 45 acts as a convex lens to converge the fundamental laser beam generated by the laser medium 45 in diameter. The surface 44R and the surface 44T are parallel to each other. The fundamental laser beam is incident on the non-linear optical crystal element 46 formed e.g. of KTP(KTiOPO₄). The surface 44R of the quarter wave plate 44 and an end face 46R of the non-linear optical crystal element 46 make up the reflecting surfaces of a resonator 43.

Similarly to the non-linear optical crystal element 16 employed in the first embodiment, the non-linear optical crystal element 46 generates a second harmonic laser beam having a frequency twice that of the fundamental laser beam by type II phase matching. The reflecting surface 44R of the quarter wave plate 44 has properties similar to those of the reflecting surface 14R of the quarter wave plate 14 of the previous first embodiment. Similarly to the reflecting surface 16R of the non-linear optical crystal element 16 of the previous first embodiment, the reflective surface 46R of the non-linear optical crystal element 46 has the properties of reflecting the fundamental laser beam and transmitting the secondary harmonic laser beam. These reflecting surfaces 44R, 46R may be formed by dichroic mirrors. The fundamental laser beam generated in the laser medium 45 is reciprocated between the reflecting surface 44R and 46R of the laser resonator 43 to effect oscillation of the second harmonic laser beam.

The heat lens generated in the laser medium 45 plays the role of preventing the laser beam incident on the non-linear optical crystal element 46 from being enlarged in diameter, as with the previous second and third embodiments. That is, with the present fourth embodiment, the fundamental laser beam diminished in diameter by the heat lens generated in the laser medium 45 is caused to be incident on the non-linear liquid crystal element 46 for efficiently generating the second harmonic laser beam. Besides, with the present embodiment, the loss difference between the two polarization modes may be eliminated, as in the above-mentioned first to third embodiments, for achieving stable oscillation devoid of spatial hole burning.

Figure 11:
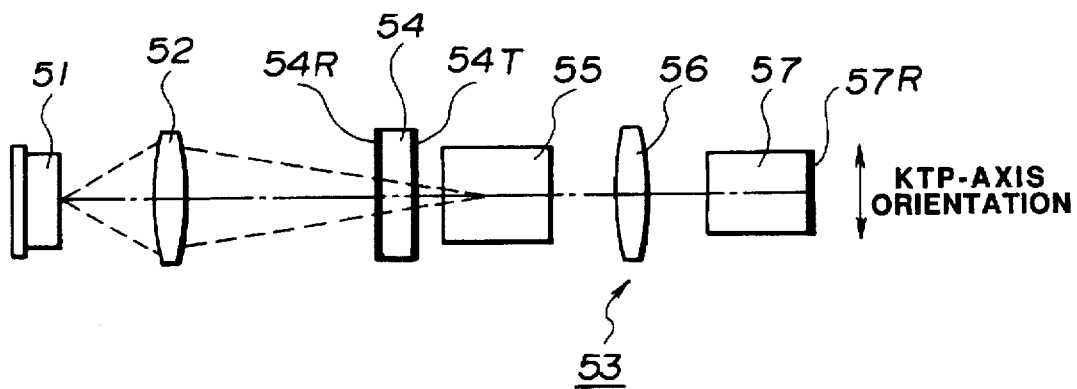
FIG. 11 shows an arrangement of a laser light generator according to a fifth embodiment of the present invention.

FIG. 11 shows an arrangement of a fourth embodiment of the laser beam generator according to the present invention.

In FIG. 11, a pumping light is radiated from a laser diode 51 which s a semiconductor laser element as a pumping light source. The pumping light is converged by lens 52 to fall on a laser medium 55 via a quarter wave plate 54 which has its one surface 54R coated by a high reflectance coating and its other surface 54T coated by an anti-reflection coating. The laser medium 55 may for example be a Nd:YAG laser medium. The laser medium 55 generates a fundamental laser beam responsive to the incident pumping light beam. The fundamental laser beam falls on a non-liner optical crystal element 57 formed e.g. of KTP(KTiOPO₄) via a convex lens 56 interposed between laser medium 55 and non-optical crystal element 57. The surface 54R of the quarter wave plate 54 and an end face 57R of the non-linear optical crystal element 57 make up the reflecting surfaces of a resonate 53.

Similarly to the non-linear optical crystal element 16 employed in the first embodiment, the non-linear optical crystal element 57 generates a second harmonic laser beam having a frequency twice that of the fundamental laser beam by type II phase matching. The reflecting surface 54R of the quarter wave plate 54 has properties similar to those of the reflecting surface 14R of the quarter wave plate 14 of the previous first embodiment. Similarly to the reflecting surface 16R of the non-linear optical crystal element 16 of the previous first embodiment, the reflective surface 57 of the non-linear optical crystal element 57 has the properties of reflecting the fundamental laser beam and transmitting the secondary harmonic laser beam. These reflecting surfaces 54R, 57R may be formed by dichroic mirrors. The fundamental laser beam generated in the laser medium 45 is reciprocated caused to travel back and forth repeatedly between the reflecting surfaces 54R and 57R of the laser resonator 53 to effect oscillation of the second harmonic laser beam.

The convex lens 56 is inserted between the laser medium and the non-linear optical crystal element 57 to prevent the laser beam incident on the non-linear optical element 57 from being enlarged in diameter similarly to the above-described second to fourth embodiments. That is, with the present fifth embodiment, the convex lens 56 is inserted between the laser medium 55 and the non-linear optical crystal element 57 for diminishing the diameter of the fundamental laser bream incident on the non-linear optical crystal element 57 to generate a more efficient second harmonic laser beam. With the present fifth embodiment, similarly to the first to fourth embodiments, the loss difference between the two polarization modes may be eliminated to provide stable oscillation free of spatial ole burning.

Figure 12:
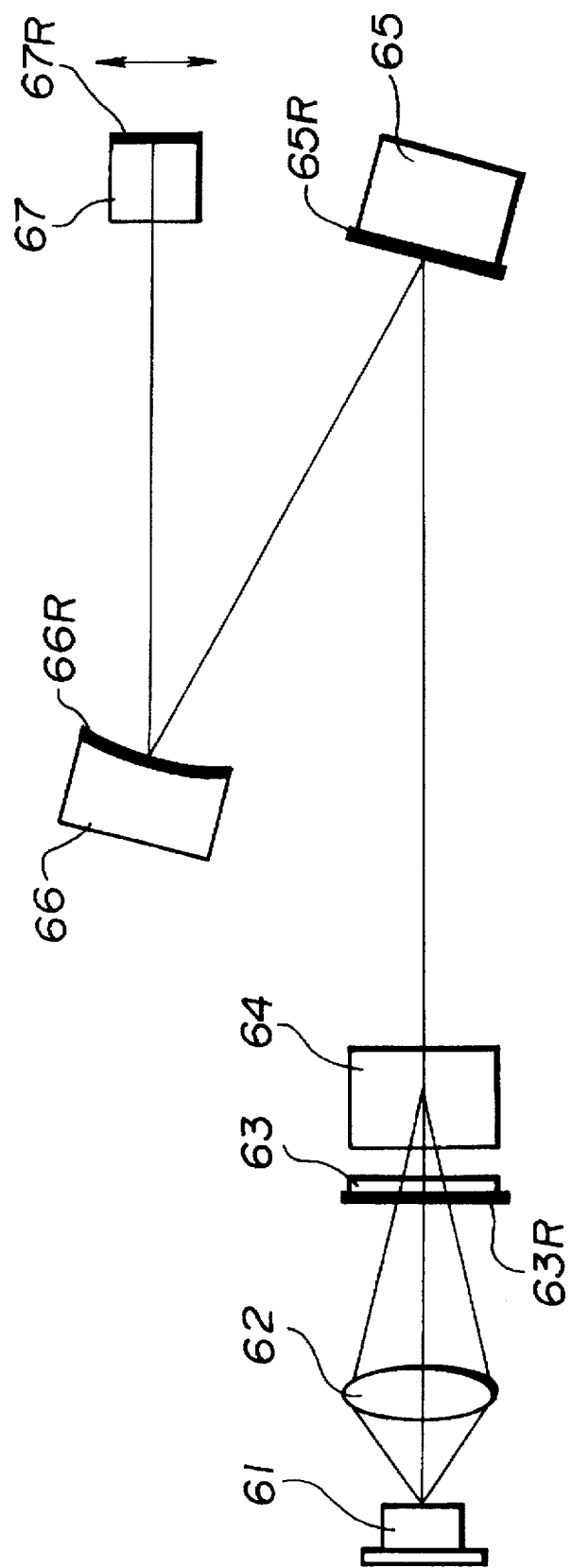
FIG. 12 shows an arrangement of a laser light generator according to a sixth embodiment of the present invention.

FIG. 12 shows an arrangement of a sixth embodiment of the laser beam generator according to the present invention.

In FIG. 12, a pumping laser light is radiated from a laser diode 61 which is a semiconductor laser element as an excitation laser light source. The pumping light is converged by lens 62 so as to fall on a laser medium 64 of e.g. Nd:YAG via a quarter wave plate 63 which has a reflective surface 63R reflecting substantially 100% of the fundamental laser beam having a wavelength of 1064 nm and transmitting substantially 100% of the pumping light having a wavelength of 810 nm. In the following description, the reflecting surface means a reflecting surface for the fundamental laser beam and a transmitting surface for the second harmonic laser beam or the pumping light. The laser medium 64 s responsive to the incident pumping light to generate the fundamental laser beam. The fundamental laser beam is guided to a non-linear optical crystal element 67 formed e.g. of KTP(KTiOPO$_4$) via a plane mirror 65 and a concave lens 66 provided for bending the light path of the fundamental laser beam. The plane lens 65 and the concave lens 66 are provided with a planar reflecting surface 65R and a concave reflecting surface 66R which are coated for reflecting substantially 100% of the fundamental laser beam of a wavelength of 1064 nm obliquely incident thereon and transmitting substantially 100% of the second harmonic laser beam of a wavelength of 532 nm obliquely incident thereon.

The non-linear optical crystal element 67 generates a second harmonic laser beam, having a frequency twice that of the fundamental laser beam, by type II phase matching. If the wavelength λ of the fundamental laser beam is 1064 nm, the wavelength of the second harmonic laser beam is λ/2 or 532 nm. Similarly to the plane lens 65 and the concave lens 66, the non-linear optical crystal element 67 has a reflecting surface 67R which has a coating thereon for reflecting substantially 100% of the fundamental laser beam having the wavelength of 1064 nm and transmitting substantially 100% of the second harmonic laser beam having a wavelength of 532 nm.

As described previously, the plane lens 65 and the concave mirror 66 have a high reflectance for the fundamental laser beam obliquely incident thereon, while having high transmittance for the second harmonic laser beam. The fundamental laser beam generated the laser medium 64 is reflected substantially in its entirety by the plane mirror 65 and by the concave lens 66 to fall on the non-linear optical crystal element 67. The non-linear optical crystal element 67 reflects the incident fundamental laser beam by its reflecting surface 67R to cause the reflected fundamental laser beam to be incident on the quarter wave plate 63 via concave lens 66 and the plane lens 65. Consequently, the fundamental laser beam, generated in the laser medium 64 is reciprocated via the plane lens 65 and the concave mirror 66 between the reflecting surfaces 67R and 63R of the laser resonator to effect laser oscillation. The second harmonic laser beam is generated in the inside of the non-linear optical crystal element 67 and is transmitted through he reflecting surface 67R to be radiated to outside. It is noted that the reflecting surface 67R does not transmit 100% of the second harmonic laser beam but reflects it in an amount of several to tens of percents thereof. However, even granting that the reflecting surfaces 67R, 66R, 65R and 63R each reflect 10% of the second harmonic laser beam incident thereon, the light reflected by the reflecting surface 67R is reflected five times before being again returned to the reflecting surface 67R, so that the effective reflectance R is equal to 0.001%. Consequently, even though the reflectance of a reflecting surface is 10%, it becomes possible to lower the interference to a negligible level by the five times of reflection.

That is, with the sixth embodiment, the plane lens 65 and the concave lens 66 are employed for bending the light path within the resonator for diminishing the effective reflectance and diminishing fluctuations in light intensity. Besides, by providing three or more mirrors on the optical path of the resonator for bending the optical path, it becomes possible to diminish fluctuations in light intensity further. If only one mirror is provided in the light path, reflection may be incurred three times, such that, if the reflection is not more than 4.6% per reflecting surface, the effective reflectance may be reduced to 0.0% to diminish fluctuations in intensity to less than 2%.

Figure 13:
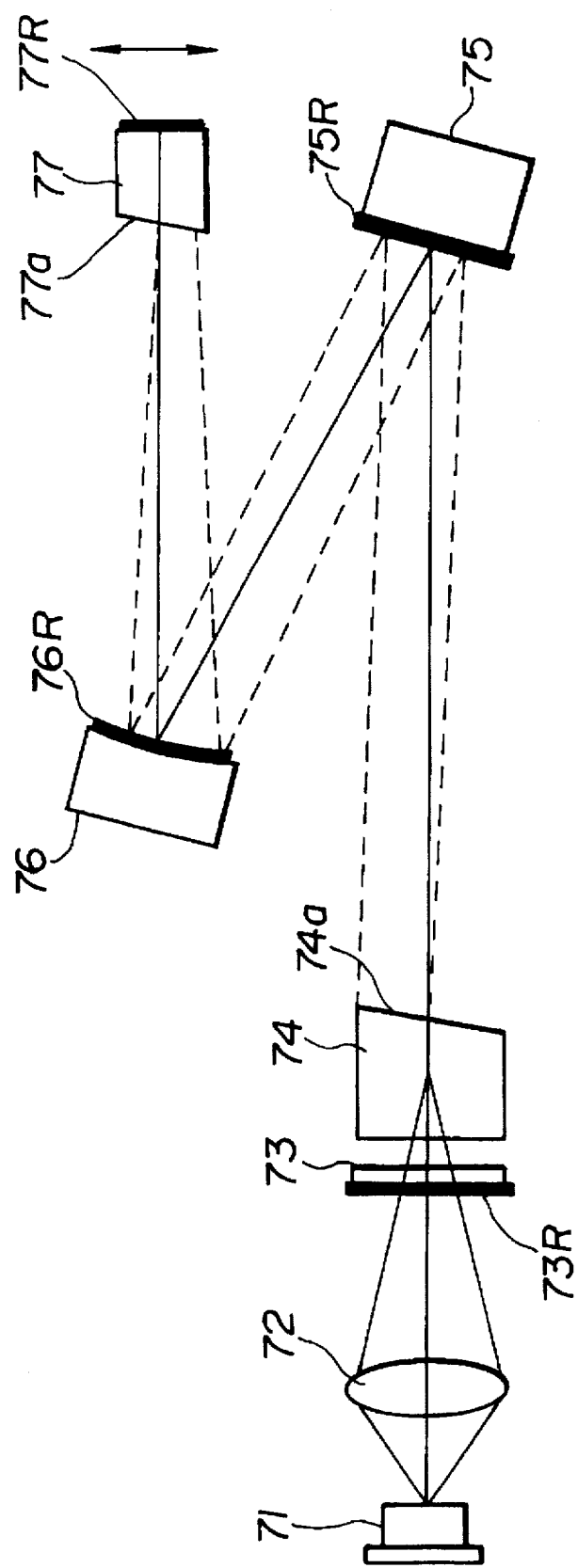
FIG. 13 shows an arrangement of a laser light generator according to a seventh embodiment of the present invention.

FIG. 13 shows an arrangement of a seventh embodiment of the laser bear generator according to the present invention.

In FIG. 13, a pumping laser light is radiated from a laser diode 71 which is a semiconductor laser element as a pumping laser light source. The pumping light is converged by lens 72 so as to fall on a laser medium 74 of e.g. Nd:YAG via a quarter wave plate, 73 which has a reflective surface 73R reflecting substantially 100% of the fundamental laser beam having a wavelength of 1064 nm and transmitting substantially 100% of the pumping light having a wavelength of 810 nm. The laser medium 74, generating the fundamental laser beam responsive to the incident pumping laser beam, has a surface 74a within the resonator which is formed obliquely with respect to the optical axis. The fundamental laser beam is transmitted via a plane mirror 75 and a concave mirror 76 deflecting the optical path of the fundamental laser beam to a non-linear optical crystal element 77 employing KTP(KTiOPO$_4$). The plane mirror 75 and the concave mirror 76 have a planar reflecting surface 75R and a concave reflecting surface 76R which has a coating thereon for reflecting substantially 100% of the fundamental laser beam of a wavelength of 1064 nm incident thereon while transmitting substantially 100% of the second harmonic laser beam of a wavelength of 532 nm incident thereon. The non-linear optical crystal element 77 also has a surface 77a within the resonator which is formed obliquely with respect to the optical axis of the generator.

Figure 14:
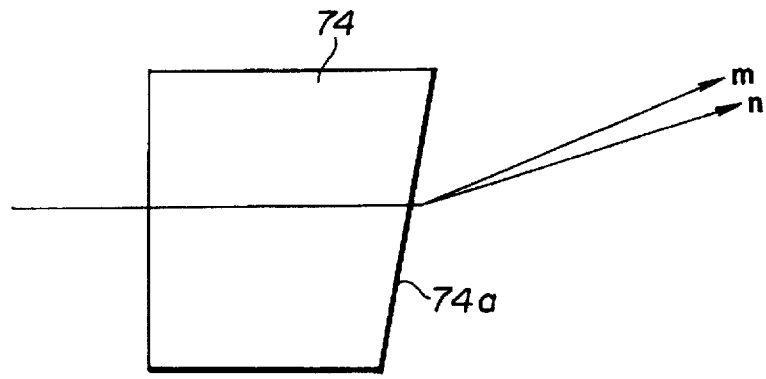
FIG. 14 illustrates a laser medium employed in the seventh embodiment.

The surface 74a of the laser medium 74 and the surface 77a of the non-linear optical crystal element 77 are formed obliquely with respect to the optical axis of the resonator for shifting the optic axis of the fundamental laser beam with respect to that of the second harmonic laser beam. If the surface 74a within the resonator of the laser medium 74 is formed obliquely as shown in FIG. 14, the optical axes are shifted relative to each other due to the difference in the refractive indices (dispersion) caused in turn by the difference in wavelength between the fundamental laser beam and the second harmonic laser beam. That is, the fundamental laser beam has an optical axis in the direction indicated as n, while the second harmonic laser beam has an optical axis in the direction indicated as m. Similarly, the non-linear optical crystal element 77 incurs deflection of the optical path of the fundamental laser beam from that of the second harmonic laser beam.

Similarly to the non-linear optical crystal element 67 of the sixth embodiment, the non-linear optical crystal element 77 has a reflecting surface 67R generating a second harmonic laser beam having a frequency twice that of the fundamental laser beam, by type II phase matching.

The lane lens 75 and the concave lens 76 have the properties similar to those of the previous sixth embodiment. That is, fundamental laser beam generated by the laser medium 74 is reflected substantially in its entirety by the plane mirror 75 and the concave mirror 76 to fall on the non-linear optical crystal element 77. The non-linear optical crystal element 77 causes the fundamental laser beam incident thereon to be reflected by its reflecting surface 77R to fall on the quarter wave plate 73 via the concave mirror 76 and the plane mirror 75. Thus the fundamental laser beam generated by the laser medium 74 is reciprocated via the plane mirror 75 and the concave mirror 76 between the reflecting surface 77R and the reflecting surface 73R of the laser resonator to achieve laser oscillation. The second ha harmonic laser beam is generated within the non-linear optical crystal element 77 and transmitted through the reflecting surface 77 to be radiated out of the laser resonator. It is noted that the reflecting surface 77R does not transmit 100% of the second harmonic laser beam but reflects it in an amount of several to tens of hundredths thereof. However, even granting that the reflecting surfaces 77R, 76R, 75R and 73R each reflect 10% of the second harmonic laser beam incident thereon, the light reflected by the reflecting surface 77R is reflected five times before being again returned to the reflecting surface 77R, so that the effective reflectance R is equal to 0.001%. Consequently, even although the reflectance of a reflecting surface 10%, it becomes possible to lower the interference to a negligible level by the five times of reflection.

That is, with the preset seventh embodiment, the plane mirror 75 and the concave mirror 76 are provided for deflecting the optical path within the resonator for diminishing the effective reflectance and fluctuations in intensity. Besides, the surfaces 74a, 77a of the laser medium 74 an the non-linear optical crystal element 77 within the resonator are slanted relative to the optical path of the resonator for deflecting the optical axis of the fundamental laser beam from that of the second harmonic laser beam for diminishing interference between the second harmonic laser beams.

Figure 15:
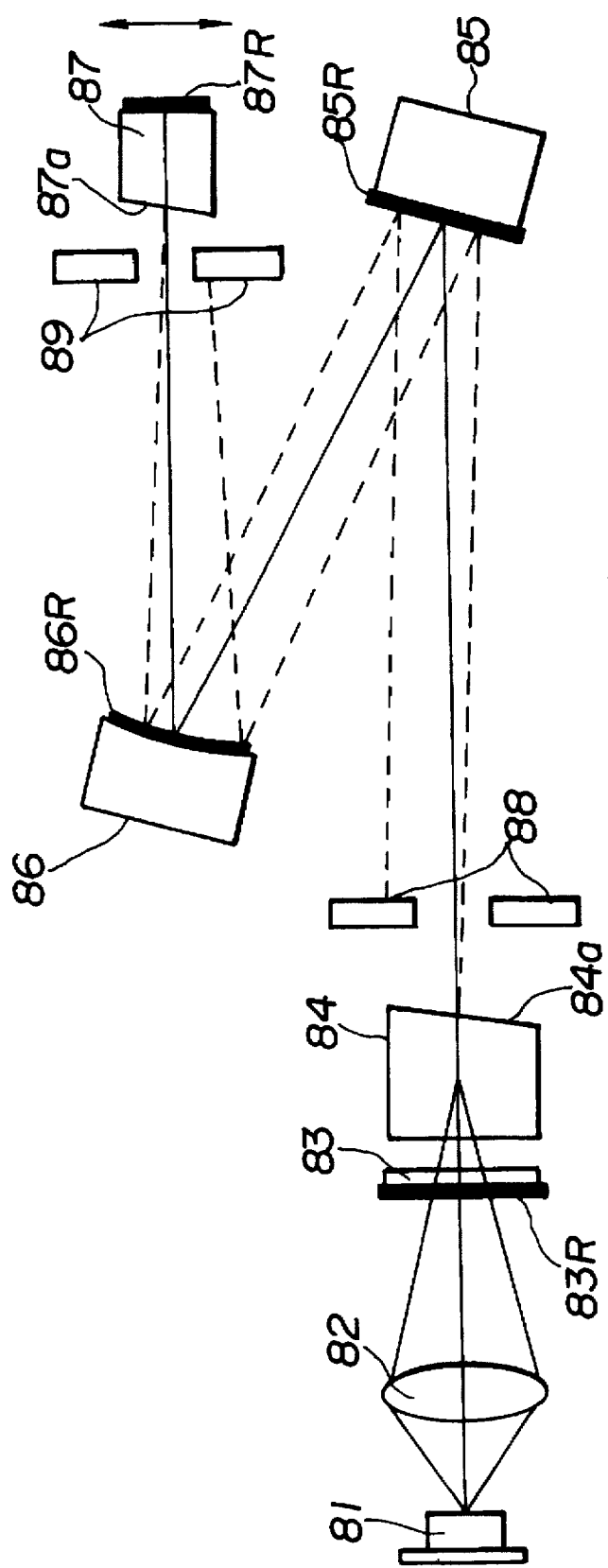
FIG. 15 shows an arrangement of a laser light generator according to an eighth embodiment of the present invention.

FIG. 15 shows an arrangement of an eighth embodiment of the laser generator according to the present invention.

In FIG. 15, a pumping laser light is radiated from a laser diode 81 which is a semiconductor laser element as an excitation laser light source. The pumping light is converged by lens 82 so as to fill on a laser medium 84 of e.g. Nd:YAG via a quarter wave plate 83 which has a reflective surface 83R reflecting substantially 100% of the fundamental laser beam having a wavelength of 1064 nm and transmitting substantially 100% of the pumping light having a wavelength of 810 nm. The laser medium 84 is responsive to the incident pumping light to generate a fundamental laser beam. The laser medium 84 has a surface 84a within the resonator extending obliquely with respect to the optical axis of the resonator. The fundamental laser beam is deflected in its optical path via an aperture 88 by a plane mirror 85 and a concave mirror 86 and another aperture 88 so as to be directed to a non-linear optical crystal element 87 formed of KTP(KTiOPO$_4$). The aperture 88 is provided at a first end of the optical path for limiting the diameter of the light beam, while the aperture 89 is provided at the opposite end of the optical path. The plane mirror 85 and the concave mirror 86 are provided with a planar reflecting surface 85R and a concave reflecting surface 86R, respectively. These reflecting surfaces 85R, 86R are coated for reflecting substantially 100% of the incident fundamental laser beam with a wavelength of 1064 nm and transmitting substantially 100% of the incident second harmonic laser beam with a wavelength of 532 nm. The non-linear optical crystal element 87 has its surface 87a within the resonator which is formed obliquely with respect to the optical axis of the resonator.

The surfaces 84a, 87a within the resonator of the laser medium 84 and the non-linear optical crystal element 87 are formed obliquely with respect to the optical axis for deflecting the optical axes of the fundamental laser beam and the second harmonic laser beam from each other, as in the seventh embodiment described above.

Similarly to the non-linear optical crystal element 67 of the sixth embodiment, the non-linear optical crystal element 87 has a reflecting surface 87a which has characteristics similar to those of the sixth embodiment and which is adapted for generating a second harmonic laser beam having a frequency twice that of the fundamental laser beam by type II phase matching.

The characteristics of the plane mirror 85 and the concave mirror 86 are also similar to those of the sixth embodiment. That is, the fundamental laser beam generated by the laser medium 84 is reflected substantially in its entirety by the plane mirror 85 and the concave mirror 86 to fall on the quarter wave plate 83. Consequently, the fundamental laser beam, generated in the laser medium 84, is reciprocated via the plane mirror 85 and the concave mirror 86 between the reflecting surfaces 87R and 83R of the laser resonator to effect laser oscillation. The second harmonic laser beam is generated in the inside of the non-linear optical crystal element 87 and is transmitted through the reflecting surface 87R to be radiated to outside. It is noted that the reflecting surface 87R does not transmit 100% of the second harmonic laser beam but reflects it in an amount of several to tens of hundredths thereof. However, even granting that the reflecting surfaces 87R, 86R, 85R and 83R each reflect 10% of the second harmonic laser beam incident thereon, the light reflected by the reflecting surface 87R is reflected five times before being again returned to the reflecting surface 67R, so that the effective reflectance R is equal to 0.001%. Consequently, even although the reflectance of a reflecting surface is 10%, it becomes possible to lower the interference to a negligible level by the five times of reflection.

Besides, with the present eighth embodiment, since the surfaces 84a, 87a of the laser medium 84 and the non-linear optical crystal element 87 within the resonator are inclined with respect to the optical axis, the optical axis of the fundamental laser beam is deflected from that of the second harmonic laser beam. Such deflection is doubled by reciprocation of the laser beam so that reflected light is deflected relative to the output second harmonic laser beam to diminish the strength of interference.

In this manner, the surfaces 84a and 87a within the resonator are inclined relative to the optical axis of the resonator for diminishing the interference produced by the reflected light from the laser medium 84 and the non-linear optical crystal element 87 within the resonator being superposed on the output second harmonic laser beam. These inclined surfaces 84a, 87a are each coated with an antireflective coating with respect to the fundamental laser beam. There is a risk that the fundamental laser beam be reflected obliquely by residual reflecting from the nonreflective surface, which is typically on the order of 0.1%, with the obliquely reflected light beam, shown by dotted lines, becoming a stray light in the resonator to pump a higher harmonic mode laser beam to detract from output stability.

Thus, with the present eighth embodiment, the apertures 88 and 89 are inserted at both ends of the optical path to remove the stray beam to assure output stability.

In sum, with the present eighth embodiment, the plane mirror 85 and the concave mirror 86 are provided for deflecting the optical path in the resonator for diminishing the effective reflectance and fluctuations in intensity. Besides, the surface 84a of the laser medium 84 and the surface 87a of the non-linear optical crystal element 87 within the resonator are inclined with respect to the optical axis of the resonator for deflecting the optical is of the fundamental laser beam from that of the second harmonic laser beam for diminishing interference between the second harmonic laser beams. The stray beam generated in this manner is removed by apertures 88, 89 for producing a stable laser output.

Meanwhile, the aperture, generally used for selecting the transverse mode, is effective with the present eighth embodiment if it is of a larger width than when it is used for selecting the transverse mode. Besides, a longitudinal slit may be used in place of circular aperture. The slit is convenient in that it permits one-dimensional adjustment.

Figure 6:
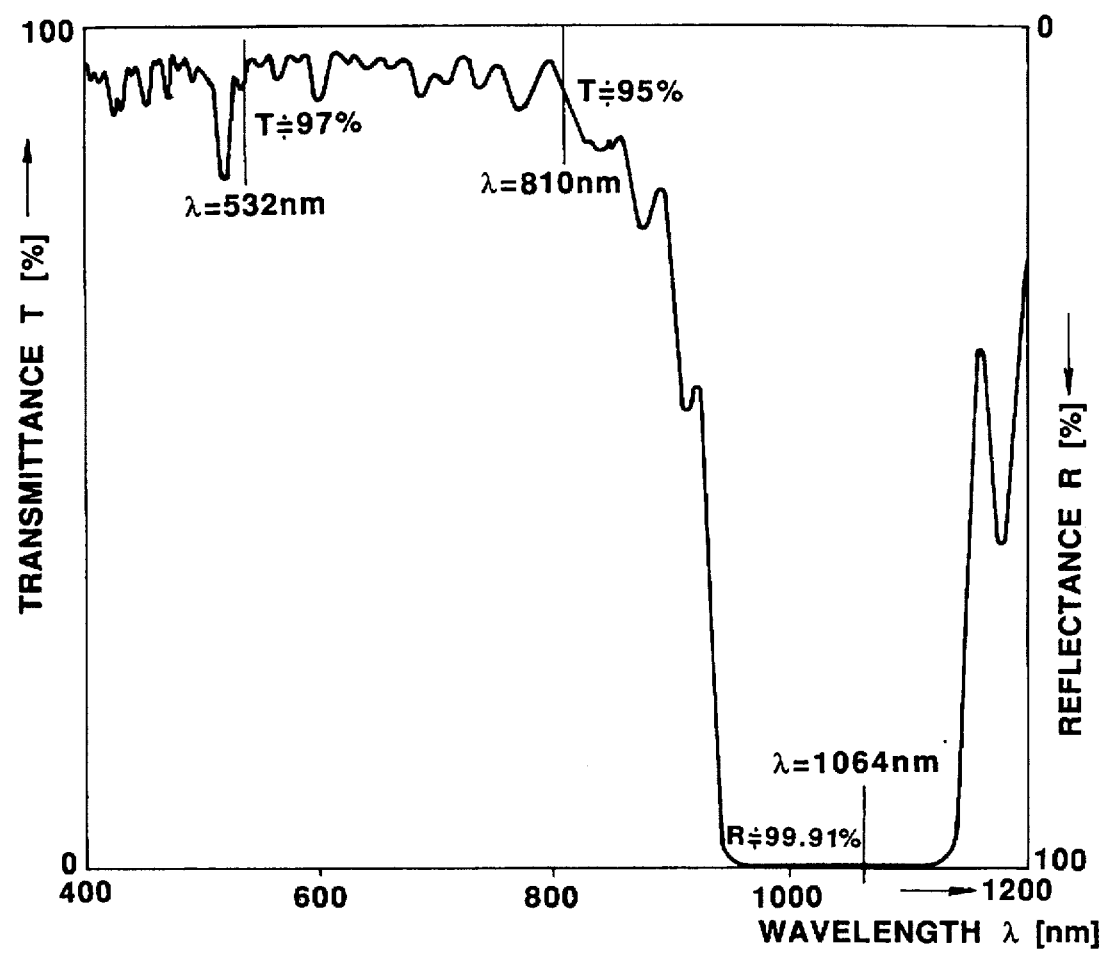
FIG. 6 is a graph showing characteristics of a mirror coating applied to quartz.

FIG. 6 shows an arrangement of a ninth embodiment of the laser beam generator according to the present invention.

Figure 16:
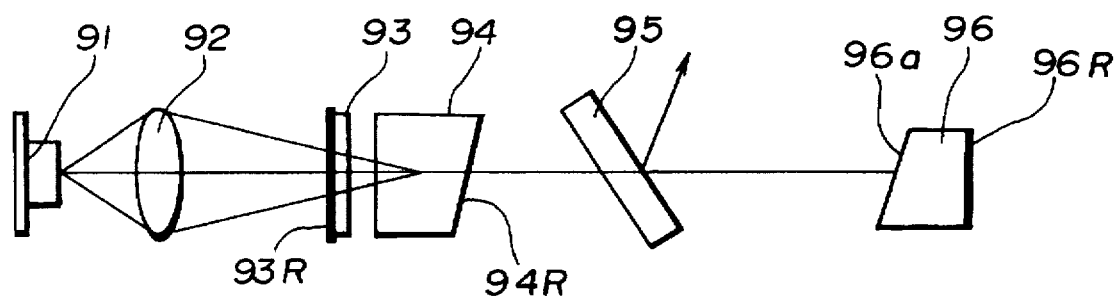
FIG. 16 shows an arrangement of a laser light generator according to a ninth embodiment of the present invention.

In FIG. 16, a pumping laser light is radiated from a laser diode 91 which is a semiconductor laser element as an excitation laser light source. The pumping light is converged by lens 92 so as to fall on a laser medium 94 of e.g. Nd:YAG via a quarter wave plate 93 which has a reflective surface 93R reflecting substantially 100% of the fundamental laser beam having a wavelength of 1064 nm and transmitting substantially 100% of the pumping light having a wavelength of 810 nm. The laser medium 94 is responsive to the incident exciting light to generate a fundamental laser beam. The laser medium 94 has a surface 94a within the resonator inclined obliquely with respect to the optical axis of the resonator. The fundamental laser beam is transmitted through an optical element 95, provided in the optical path at an angle deflected from the optical axis, so as to be directed to a non-linear optical crystal element 96 formed e.g. of P(KTiOPO$_4$). The non-linear optical crystal element 96 also has its surface 96a disposed within the resonator inclined with respect to the optical axis. The non-linear optical crystal element 96 has a reflective surface 96R which reflects substantially 10% of the fundamental laser beam while transmitting substantially 100% of the second harmonic laser beam having a wavelength) of 532 nm.

Similarly to the non-linear optical crystal element 67 of the sixth embodiment, the non-linear optical crystal element 96 generates a second harmonic laser beam having a frequency twice that of the fundamental laser beam by type II phase matching.

The optical element 95 is inserted into the resonator at an angle deflected from the optical axis and has characteristics of transmitting) 100% of the fundamental laser beam and reflecting substantially 100% of the second harmonic laser beam at an angle offset from the optical axis. The optical crystal element 95 may also be of such characteristics of absorbing substantially 100% of the second harmonic laser beam.

In sum, with the present ninth embodiment, the optical element 95, inserted into the optical path at an angle offset from the optical axis, reflects or absorbs the reflected second harmonic laser beam from the non-linear optical crystal element 96 at the angle offset from the optical axis for diminishing interference between the second harmonic laser beams.

Meanwhile, since the surfaces 94a of the laser medium 94 and the surface 96a of the non-linear optical crystal element 96, disposed within the resonator, are inclined with respect to the optical axis, the second harmonic laser beam is reflected at an angle offset from the optical axis. The surfaces 94a, 96a are coated with a nonreflective coating with respect to the fundamental laser beam. If these surfaces are coated by coatings which are nonreflective with respect to the fundamental laser beam and which are reflective as highly as possible with respect to the second harmonic laser beam, it is possible to diminish the effects of interference between the second harmonic laser beams. Since a reflective film which is mainly nonreflective with respect to the fundamental laser beam and which reflects substantially 50% of the second harmonic laser beam by several superposed dielectric layers may be implemented, such surface may be provided as the above-mentioned surfaces of the non-linear optical crystal element 96 and the laser medium 94 for providing the value of transmittance of 6.3% of the reflected light beam contributing to interference.

Figure 17:
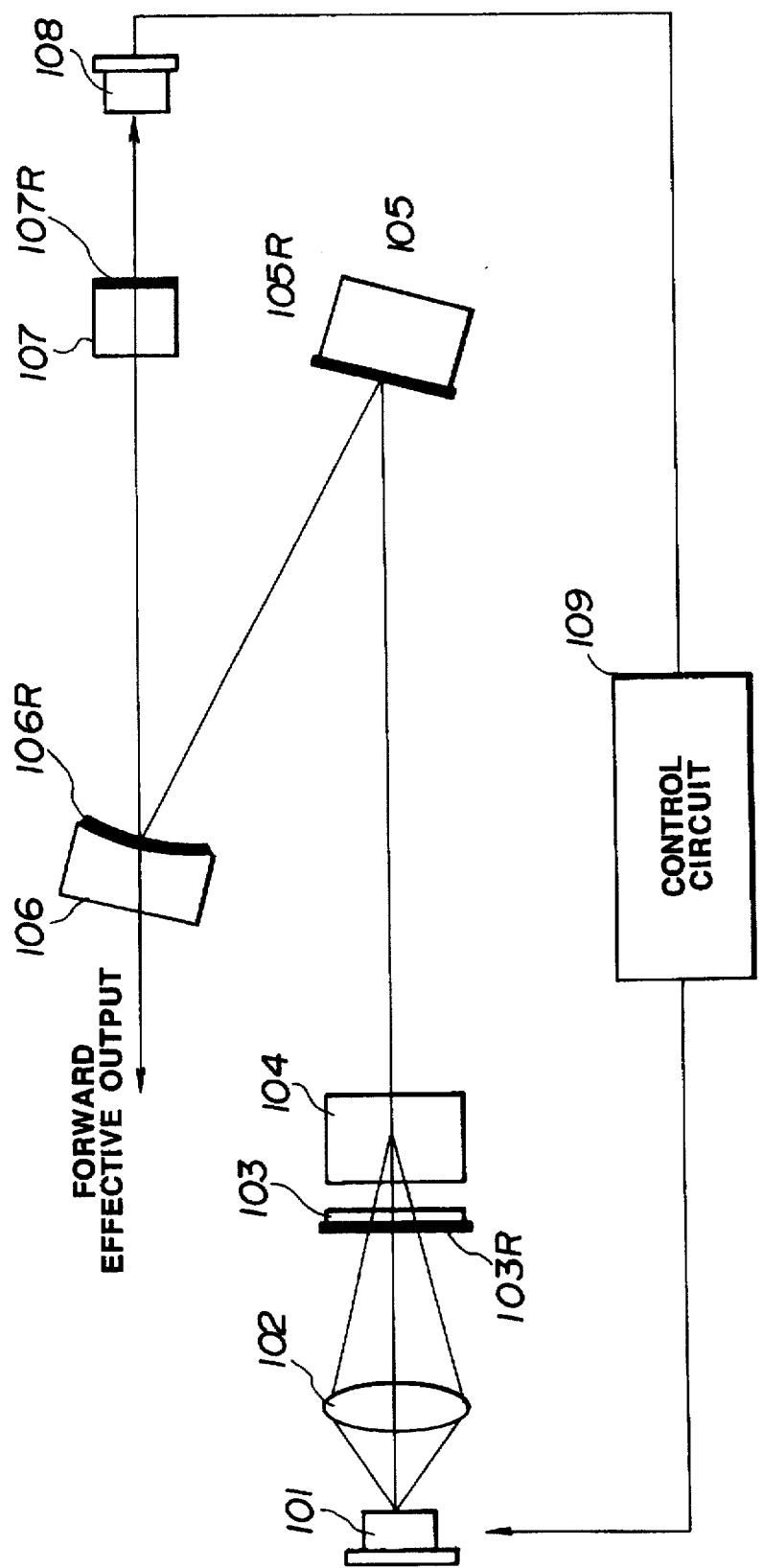
FIG. 17 shows an arrangement of a laser light generator according to a tenth embodiment of the present invention.

FIG. 17 shows an arrangement of a tenth embodiment of the laser beam generator according to the present invention.

In FIG. 17, a pumping laser light is radiated from a laser diode 101, which is a semiconductor laser element as an excitation laser light source. The pumping light is converged by lens 102 so as to fall on a laser medium 104 of e.g. Nd:YAG via a quarter wave plate 103 which has a reflective surface 103R reflecting substantially 100% of the fundamental laser beam having a wavelength of 1064 nm and transmitting substantially 100% of the pumping light having a wavelength of 810 nm. The laser medium 104 is responsive to the incident pumping light to generate a fundamental laser beam. It is noted that the reflective surface in the present embodiment means a reflective surface with respect to the fundamental laser beam and becomes a transmitting surface with respect to the exciting light.

The fundamental laser beam is directed to a non-linear optical crystal element of e.g. KTP(KTiOPO$_4$) via a plain mirror 105 and concave mirror 106 provided for deviating the fundamental laser beam. The plane mirror 105 and the concave mirror 106 are provided with a planar reflective surface 105R and a concave reflecting surface 106R, respectively, which are coated in such a manner as to reflect substantially 100% of the fundamental laser beam of a wavelength of 1064 nm obliquely incident hereto, as well as to transmit substantially 100% of the second harmonic laser beam of a wavelength of 532 nm obliquely incident thereto. The non-linear optical crystal element 107 generates a second harmonic laser beam having a frequency twice that of the fundamental laser beam by type II phase matching. If the wavelength λ of the fundamental laser beam is 1064 nm, the wavelength of the second harmonic laser beam is λ/2 or 532 nm. Similarly to the plane mirror 105 and the concave mirror for 106, the non-linear optical crystal element 107 has a reflective surface 107R coated for reflecting substantially 100% of the incident fundamental laser beam of a wavelength of 1064 nm transmitting substantially 100% of the incident second harmonic laser beam of a wavelength of 532 nm.

A photodetector 108, such as a photodiode, placed at the back of the reflective surface 107R, detects the second harmonic laser beam transmitted through the reflective surface 107R. The photodetector, 108 is connected to a control circuit 109 for supplying a detection signal thereto. The control circuit 109 is responsive to the detection signal to control an output of the laser diode 101 which is controlled by control circuit 109 for assuring constant output of the second harmonic laser beam.

As described above, the plane mirror 105 and the concave mirror 10 exhibit high reflectance and high transmittance with respect to the obliquely incident fundamental laser beam and with respect to the second harmonic laser beam, respectively. The fundamental laser beam, generated by the laser medium 104, is reflected by the plane mirror 105 and the concave mirror 106 so as to fall on the non-linear optical crystal element 107 which reflects the fundamental laser beam incident thereto by its reflective surface 107 to direct it via the plane mirror 105 and the concave mirror 106 to the quarter wave plate 103. Thus the fundamental laser beam, generated by the laser medium 104, is reciprocated via the plane mirror 105 and the concave mirror 106 between the reflective surfaces 107R and 103R making up the resonator by way of laser oscillation. Within the non-linear optical crystal element 107, the second harmonic laser beam is generated for proceeding in two directions, i.e. towards the reflective surface 106R and towards the reflective surface 103R. The reflecting surfaces 106a and 107a transmit the second harmonic laser beams. That is, the second harmonic laser beam may be taken out of the resonator not only by the reflective surface 106R but also by the reflective surface 107R.

The second harmonic laser beam, taken out by the reflective surface 106R, is a froward effective output, while the second harmonic laser beam, taken out by the reflective surface 107R, is a backward effective output.

With the present embodiment, the backward output is detected by photodetector 108 the rearward output light is detected by photodetector 108 and control circuit 109 is responsive to the backward output to control the output of laser diode 101. The forward output is directed to an optical disc etc.

It is noted that the reflecting surfaces 106R, 107R do not transmit 100% of the second harmonic laser beam but reflect it in an amount of several to tens of hundredths thereof. However, even granting that the reflecting surfaces 107R, 106R, 105R and 103R each reflect 10% of the second harmonic laser beam incident thereon, the light reflected by the reflecting surface 107R is reflected five times before being again returned to the reflecting surface 107R, so that the effective reflectance R is equal to 0.001%. Consequently, even although the reflectance of a reflecting surface is 10%, it becomes possible to lower the interference to a negligible level by the five times of reflection.

If the number of mirrors inserted into the optical path of the resonator to three or more, it becomes possible to diminish fluctuations in light intensity further. If only one mirror is provided in the light path, reflection may be incurred three times, such that, if the reflection is not more than 4.6% per reflecting surface, the effective reflectance may be reduced to 0.0% to diminish fluctuations in intensity to less than 2%.

Figure 18:
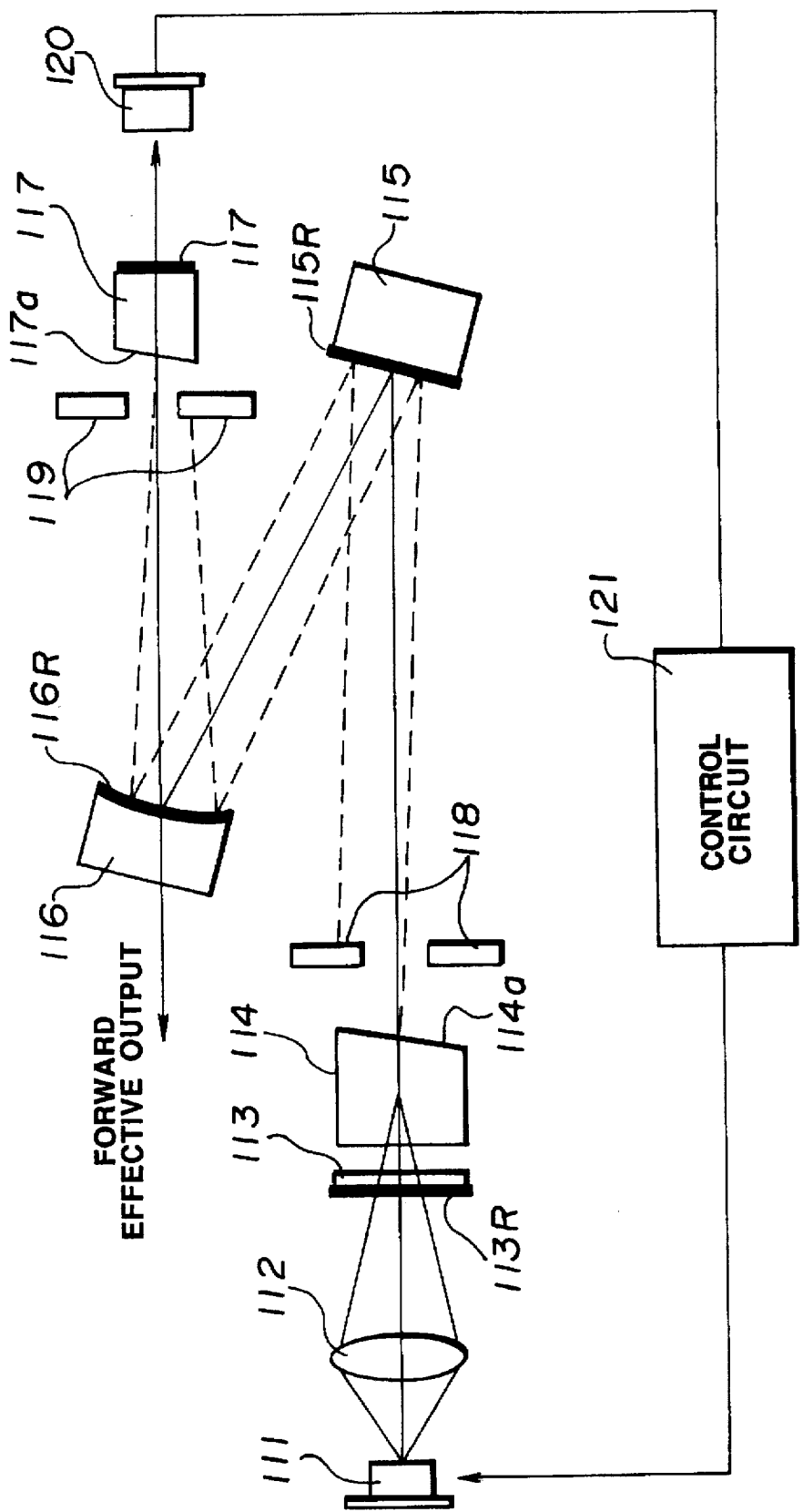
FIG. 18 shows an arrangement of a laser light generator according to an eleventh embodiment of the present invention.

FIG. 18 shows an arrangement of an eleventh embodiment of the laser beam generator according to the present invention.

The present eleventh embodiment is designed to diminish further the fluctuations in intensity by the interference of the second harmonics generated in either directions of the optical axis of the resonator.

In FIG. 18, a pumping laser light is radiated from a laser diode 111 which is a semiconductor laser element as an excitation laser light source. The pumping light is converged by lens 112 so as to fall on a laser medium 114 of e.g. Nd:YAG via a quarter wave plate 113 which has a reflective surface 113R reflecting substantially 100% of the fundamental laser beam having a wavelength of 1064 nm and transmitting substantially 100% of the pumping light having a wavelength of 810 nm. The laser medium 114 is responsive to the incident exciting light to generate a fundamental laser beam. The laser medium 114 has a surface 114a within resonator extending obliquely with respect to the optical axis of the resonator. The fundamental laser beam is deflected via an aperture 118 by a plane mirror 115 and a concave mirror 116 and another aperture 118 so as to be directed to a non-linear optical crystal element 117 formed of KTP (KTiOPO$_4$). The aperture 118 is provided at a first end of the optical path for limiting the diameter of the light beam, while the aperture 119 is provided at the opposite end of the optical path. The plane mirror 115 and the concave mirror 116 are provided with a planar reflecting surface 115R and a concave reflecting surface 116R, respectively. These reflecting surfaces 115R, 116R each provided with a coating thereon for reflecting substantially 100% of the incident fundamental laser beam with a wavelength of 1064 nm and transmitting substantially 100% of the second harmonic laser with a wavelength of 532 nm. The non-linear optical crystal element 117 has its surface 117a within the resonator formed obliquely with respect to the optical axis of the resonator.

The surfaces 114a, 117a within the resonator of the laser medium 114 and the non-linear optical crystal element 117 are formed obliquely with respect to the optical axis for deflecting the optical axes of the fundamental laser beam and the second harmonic laser beam from each other.

Similarly to the non-linear optical crystal element 107 of the tenth embodiment, the non-linear optical crystal element 117 has a reflecting surface 117a having characteristics similar to those of the tenth embodiment and adapted for generating a second harmonic laser beam having a frequency twice that of the fundamental laser beam, by type II phase matching.

A photodetector 120, such as a photodiode, placed at back of the reflective surface 117R, detects the second harmonic laser beam transmitted through the reflective surface 117R. The photodetector 120 is connected to a control circuit 121 for supplying a detection signal thereto. The control circuit 121 is responsive to the detection signal to control an output of the laser diode 111. Similarly to the laser diode 101 of the tenth embodiment, laser diode 111 is controlled by control circuit 121 for assuring a constant output of the second harmonic laser beam.

The characteristics of the plane mirror 115 and the concave mirror 116 are similar to those of the tenth embodiment. That is, the fundamental laser beam, generated by the laser medium 114, is reflected by the plane mirror 115 and the concave mirror 116 so as to fall on the non-linear optical crystal element 117 which reflects the fundamental laser beam incident thereto by its reflective surface 117R to direct it via the plane mirror 115 and the concave mirror 116 to the quarter wave plate 113. Thus the fundamental laser beam, generated by the laser medium 114, is reciprocated via the plane mirror 115 and the concave mirror 116 between the reflective surfaces 117R and 113R making up the resonator to effect laser oscillation. Within the non-linear optical crystal element 117, the second harmonic laser beam generated or proceeding in two directions, i.e. towards the reflective surface 116R and towards the reflective, surface 117R. That is, the second harmonic laser beam may be taken out of the resonator not only by the reflective surface 116R but also by the reflective surface 117R.

The second harmonic laser beam, taken out by the reflective surface 116R, is a forward effective output, while the second harmonic laser beam, taken out by the reflective surface 117R, is a backward effective output. With the present embodiment, the backward output is detected by photodetector 120 and control circuit 121 is responsive to the backward output to control the output of laser diode 111. The forward output is directed to an optical disc etc.

It is noted that the reflecting surfaces 116R, 117R do not transmit 100% of the second harmonic laser beam but reflect it in an amount of several to tens of hundredths thereof. However, even granting that the reflecting surfaces 117R, 116R, 115R and 113R each reflect 10% of the second harmonic laser beam incident thereon, the light reflected by the reflecting surface 117R is reflected five times before being again returned to the reflecting surface 117R, so that the effective reflectance R is equal to 0.001%. Consequently, even although the reflectance of a reflecting surface is 10%, it becomes possible to lower the interference to a negligible level by the five times of reflection.

Besides, with the present eleventh embodiment since the surfaces 114a, 117a of the laser medium 114 and the non-linear optical crystal element 117 within the resonator are inclined with respect to the optical axis, the optical axis of the fundamental laser beam is deflected from that of the second harmonic laser beam. Such deflection is doubled by reciprocation of the laser beam and the reflected light is deflected relative to the output second harmonic laser beam to diminish the strength of interference.

In this manner, the surfaces 114a and 117a within the resonator are inclined relative to the optical axis for diminishing the interference produced by the reflected light from the laser medium 114 and the non-linear optical crystal element 117 within the resonator being superposed on the other second harmonic laser beam. These inclined surfaces 114a, 117a are coated with an anti-reflective coating with respect to the fundamental laser beam. There is a risk that the fundamental laser beam be reflected obliquely by residual reflection from the anti-reflective surface, typically on the order of 0.1%, with the obliquely reflected light beam, shown by dotted lines, becoming a stray light in the resonator to pump a higher harmonic mode laser beam to detract from output stability.

Thus, with the present eleventh embodiment, the apertures 118 and 119 are inserted at both ends of the optical path to remove the stray beam in the resonator to assure stability in the second harmonic laser beam output.

In sum, with the present eleventh embodiment, the plane mirror 115 and the concave mirror 116 are provided for deflecting the optical path within the resonator for diminishing the effective reflectance and fluctuations in intensity. Besides, the surface 114R of the laser medium 114 and the surface 117R of the non-linear optical crystal element 117 within the resonator are inclined with respect to the optical axis for deflecting the optical axis of the fundamental laser beam from that of the second harmonic laser beam for diminishing interference between the second harmonic laser beams. The stray light generated at this time is removed by apertures 118, 119 to produce a stable output. The forward effective output is coincident with the backward effective output. The backward output light is detected by photodetector 120 and, responsive to the detection signal, control circuit 121 controls an output of laser diode 111 generating the fundamental laser beam. The result is that the light intensity of the forward effective output may be controlled to a constant value to output a second harmonic laser beam which remains stable for an extended period of time.

It is to be noted that the present invention is not limited to the above-described embodiments. For example, an optical element capable of reflecting or absorbing the second harmonic laser beam generated by the non-linear optical element at an angle offset from the optical axis of the laser resonator may be provided within the optical path of the resonator as means for reducing the interference of the second harmonic laser beams generated in either directions along the optical axis of the laser resonator for decreasing fluctuations in light intensities. In such case, the necessity of providing a mirror for deflecting the optical path between the fundamental laser beam and the second harmonic laser beam may be eliminated.

The second harmonic laser beam detected by the photodetector may also be a forward output instead of the backward output, in which case it is the backward output which is radiated on the optical disc etc. as an effective output.

Besides, if the quarter wave plate for the fundamental laser beam is also used as the quarter wave plate for the second harmonic laser beam, the interference effects may be diminished because the plane of polarization is rotated by 90° on reciprocation of the laser beam and hence the polarized beams perpendicular to each other do not interfere with each other.

The laser medium Nd:YAG in each of the above-described embodiments may also be replaced by Nd:YVO$_4$ or LNP. Besides, the non-linear optical crystal element may also be formed of non-lineal optical crystal materials capable of generating second harmonic laser beams, such as LBO, LiNbO$_3$, BBO, KNbO$_3$, etc. instead of KTP, for both types I and II of the phase matching.

In addition, the present invention may be applied not only to an internal resonator type laser beam generator, in which the second harmonic laser beam is generated within the standing wave type resonator, but also to an external resonator type laser beam generator in which the non-linear optical crystal element is placed within the standing wave resonator.

What is claimed is:

1. A laser beam generator comprising a pair of reflecting means constituting a resonator, a laser light source for radiating a pumping light beam from outside of said resonator, a laser medium for generating fundamental frequency laser beam by a pumping light beam from said light source, a non-linear optical crystal element provided within said resonator for generating a second harmonic laser beam when the fundamental frequency laser beam is passed therethrough in resonant oscillation, and reflecting means provided within said resonator for deflecting the optical path of said fundamental frequency laser beam and the optical path of said second harmonic laser beam into different paths.

2. A laser beam generator comprising a laser light source for generating a pumping light beam, a first reflecting means, a second reflecting means, a laser medium provided between said first and second reflecting means for generating a fundamental frequency laser beam, said laser medium having a first surface and a second surface through which the laser beam enters and exists, respectively, said first surface being irradiated with the pumping light from said laser light source and being perpendicular to an optical axis of the fundamental frequency laser beam, said second surface being non-parallel to said first surface, a non-linear optical crystal element provided between said first and second reflecting means for generating a second harmonic laser beam when said fundamental frequency laser beam from said laser medium is passed therethrough in resonant oscillation, and a third reflecting means provided within said resonator for deflecting the light path of one of said fundamental frequency laser beam and said second harmonic laser beam away from the light path of the other of said fundamental frequency laser beam and said second harmonic laser beam.

3. The laser beam generator as claimed in claim 2 wherein an element for limiting the size of a light beam is provided in the optical path within said resonator.

4. A laser beam generator comprising a light beam source for generating a pumping light beam, a first reflecting means, a second reflecting means, a laser medium provided between said first and second reflecting means, said laser medium being irradiated with the pumping light beam from said light beam source through said first reflecting means for generating a fundamental frequency laser beam, a non-linear optical crystal element provided between said first and second reflecting means, said non-linear optical crystal element being irradiated with the fundamental frequency laser beam from said laser medium for generating a second harmonic laser beam, a third reflecting means for outputting by reflection the second harmonic laser beam from said non-linear optical crystal element, and a controller for controlling said light beam source based on the second harmonic laser beam from said second reflecting means or said third reflecting means.

5. The laser beam generator as claimed in claim 4 wherein said controller comprises a photodetector receiving the second harmonic laser beam from said second reflecting means or said third reflecting means and a control circuit which is supplied with an output signal from said photodetector for generating a control signal which is supplied to said light beam source.

6. The laser beam generator as claimed in claim 4 further comprising at least one element provided between said first and second reflecting means for limiting the size of a light beam between said first and second reflecting means.

7. The laser beam generator as claimed in claim 4 further comprising a pair of reflecting means between said first and second reflecting means.

8. A laser beam generator comprising:

a resonator having at least a pair of reflecting means, a laser medium provided within said resonator and adapted for generating a fundamental laser beam by a pumping beam radiated from outside, a non-linear optical crystal element placed within said resonator and adapted for generating a second harmonic laser beam under type II phase matching conditions when a fundamental laser beam from said laser medium is passed therethrough in resonant oscillation, one of surfaces of said non-linear optical crystal element being said reflecting means of said resonator, and a birefringent element having its one surface at an incident side of the pumping beam coated by a highly reflective coating and its other surface parallel to said one surface coated by an anti-nonreflective coating, said surface coated with the highly reflective surface being one said reflecting means of said resonator, an optical axis folding means placed between said laser medium and said non-linear optical crystal element in said resonator for setting the optical axis folding orientation within said resonator, said birefringent element is arranged with its orientation inclined by 45° with respect to the orientation of the difference in the reflectance of said optical axis folding means.

9. A laser beam generator as claimed in claim 8 wherein said optical axis folding means is an additional reflecting means.

10. A laser beam generator as claimed in claim 8 wherein said laser medium has its one surface on the optical axis as a convex surface.

* * * * *